United States Patent
Morita et al.

(10) Patent No.: US 12,347,470 B2
(45) Date of Patent: Jul. 1, 2025

(54) SERVO PATTERN RECORDING METHOD, SERVO PATTERN RECORDING APPARATUS, METHOD OF PRODUCING MAGNETIC TAPE, MAGNETIC TAPE, AND TAPE CARTRIDGE

(71) Applicant: Sony Group Corporation, Tokyo (JP)

(72) Inventors: Hiroshi Morita, Tokyo (JP); Kazuo Anno, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/281,842

(22) PCT Filed: Feb. 16, 2022

(86) PCT No.: PCT/JP2022/006074
§ 371 (c)(1),
(2) Date: Sep. 13, 2023

(87) PCT Pub. No.: WO2022/196225
PCT Pub. Date: Sep. 22, 2022

(65) Prior Publication Data
US 2024/0161775 A1 May 16, 2024

(30) Foreign Application Priority Data
Mar. 18, 2021 (JP) .................. 2021-044762

(51) Int. Cl.
G11B 5/584 (2006.01)
G11B 5/78 (2006.01)

(52) U.S. Cl.
CPC ............ G11B 5/584 (2013.01); G11B 5/78 (2013.01)

(58) Field of Classification Search
None
See application file for complete search history.

(56) References Cited

U.S. PATENT DOCUMENTS 5,592,347 A * 1/1997 Mori .................. G11B 5/09 360/48
5,771,131 A * 6/1998 Pirzadeh ............ G11B 5/59688
(Continued)

FOREIGN PATENT DOCUMENTS

| JP | 2005285268 A | 10/2005 |
| JP | 2011523487 A | 8/2011 |
| JP | 2020155188 A | 9/2020 |

OTHER PUBLICATIONS

International Search Report from corresponding PCT application PCT/JP2022/006074, dated May 17, 2022.
(Continued)

Primary Examiner — Peter Vincent Agustin
(74) Attorney, Agent, or Firm — K&L Gates LLP

(57) ABSTRACT

A servo pattern recording method according to an embodiment of the present technology is a method of recording a servo pattern in a plurality of servo bands arrayed at intervals in a width direction of a magnetic layer of a magnetic tape, including: causing the magnetic tape to travel with a predetermined tension; and recording a servo pattern in the plurality of servo bands at a second pitch narrower than a first pitch that is an arrangement interval of two servo read heads in a tape drive device that records data in the magnetic layer or reproduces data recorded in the magnetic layer.

16 Claims, 17 Drawing Sheets

(56) References Cited

U.S. PATENT DOCUMENTS

| | | | |
|---|---|---|---|
| 6,657,947 B1* | 12/2003 | Ishizaki | B82Y 10/00 |
| | | | 369/275.3 |
| 2003/0002182 A1* | 1/2003 | Kamatani | G11B 23/505 |
| 2003/0095353 A1* | 5/2003 | Nakao | G11B 5/584 |
| 2005/0057839 A1* | 3/2005 | Ohtsu | G11B 5/02 |
| 2005/0157422 A1* | 7/2005 | Dugas | G11B 5/265 |
| 2006/0066976 A1* | 3/2006 | Ohtsu | G11B 5/584 |
| 2009/0279202 A1 | 11/2009 | Cherubini et al. | |
| 2013/0182346 A1 | 7/2013 | Fasen | |
| 2020/0302963 A1* | 9/2020 | Murata | G11B 5/70678 |
| 2024/0161775 A1* | 5/2024 | Morita | G11B 5/584 |

OTHER PUBLICATIONS

Standard ECMA-319, ECMA, 2001.06, [online], [retrieved on Apr. 22, 2022], Retrieved from the internet: <https://www.ecma-international.org/wp-content/uploads/ECMA-319_1st_edition_june_2001.pdf>, pp. 48, 56, 11. 5 Servo band pitch, p. 56.

* cited by examiner

SERVO PATTERN RECORDING METHOD, SERVO PATTERN RECORDING APPARATUS, METHOD OF PRODUCING MAGNETIC TAPE, MAGNETIC TAPE, AND TAPE CARTRIDGE

TECHNICAL FIELD

The present technology relates to a servo pattern recording method, a servo pattern recording apparatus, a method of producing a magnetic tape, a magnetic tape, and a tape cartridge.

BACKGROUND ART

In recent years, a magnetic recording medium has been widely used for backing up electronic data, and the like. As one magnetic recording medium, for example, a magnetic tape cartridge has a large capacity and can be preserved for a long time, and thus, the magnetic tape cartridge has attracted increasing attention as a storage medium for big data and the like.

A plurality of data bands parallel to a tape longitudinal direction is provided in a magnetic tape according to the LTO (Linear Tape Open) standard, and data is recorded on a plurality of recording tracks inside the plurality of data bands. Further, a plurality of servo bands parallel to the tape longitudinal direction is provided in the magnetic tape, and each data band is disposed in the magnetic layer so as to be sandwiched between the plurality of servo bands. A servo pattern having a predetermined shape is recorded in each servo band, the servo pattern executing positioning (tracking) control of a recording/reproducing head with respect to each recording track, tape information and servo band identification information for specifying a data band being embedded in the servo pattern (see, for example, Patent Literatures 1 and 2).

CITATION LIST

Patent Literature

Patent Literature 1: Japanese Unexamined Patent Application Publication No. 2011-523487
Patent Literature 2: Japanese Patent Application Laid-open No. 2005-285268

DISCLOSURE OF INVENTION

Technical Problem

A magnetic tape is typically produced through application of a magnetic material to a base film, calendering, cutting, recording processing of a servo pattern, and the like. Since these processes are performed while winding the base film with a constant tension, the obtained magnetic tape has internal strain and tends to expand in width over time. For this reason, when recording or reproducing data by a tape drive device, even if the magnetic tape is caused to travel with the same tension as that when recording the servo pattern, the width dimension of the magnetic tape is greater than the width dimension of the magnetic tape when recording the servo pattern in some cases. In this case, since the intervals between adjacent servo bands change, the intervals between the servo patterns recorded in these servo bands also fluctuate, and thus, desired tracking control becomes difficult. Such a problem can occur significantly due to the thinning of magnetic tapes accompanying the recent increase in recording capacity.

In view of the circumstances as described above, it is an object of the present technology to provide a servo pattern recording method, a servo pattern recording apparatus, a method of producing a magnetic tape, a magnetic tape, and a tape cartridge that are capable of ensuring desired tracking control.

Solution to Problem

A servo pattern recording method according to an embodiment of the present technology is a servo pattern recording method of recording a servo pattern in a plurality of servo bands arrayed at intervals in a width direction of a magnetic layer of a magnetic tape, including:
  causing the magnetic tape to travel with a predetermined tension; and
  recording a servo pattern in the plurality of servo bands at a second pitch narrower than a first pitch that is an arrangement interval of two servo read heads in a tape drive device that records data in the magnetic layer or reproduces data recorded in the magnetic layer.

A servo pattern recording apparatus according to an embodiment of the present technology is a servo pattern recording apparatus that records a servo pattern in a plurality of servo bands arrayed at intervals in a width direction of a magnetic layer of a magnetic tape, including: a servo write head that includes a plurality of recording units arranged corresponding to the plurality of servo bands.

Each of the plurality of recording units includes a magnetic gap for recording a servo pattern in the plurality of servo bands at a second pitch narrower than a first pitch that is an arrangement interval of two servo read heads in a tape drive device that records data in the magnetic layer or reproduces data recorded in the magnetic layer.

A method of producing a magnetic tape according to an embodiment of the present technology is a method of producing a magnetic tape that includes a magnetic layer including a plurality of servo bands arrayed at intervals in a width direction, including:
  causing the magnetic tape to travel with a predetermined tension; and
  recording a servo pattern in the plurality of servo bands at a second pitch narrower than a first pitch that is an arrangement interval of two servo read heads in a tape drive device that records data in the magnetic layer or reproduces data recorded in the magnetic layer.

A magnetic tape according to an embodiment of the present technology includes: a magnetic layer that includes a plurality of servo bands arrayed at intervals in a width direction.

The magnetic layer at least partially has a region in which a servo band pitch that is a distance between two adjacent servo bands is narrower than an arrangement interval of two servo read heads in a tape drive device that records information in the magnetic layer or reproduces information recorded in the magnetic layer.

A tape cartridge according to an embodiment of the present technology includes: a cartridge case; a tape reel that is rotatably housed inside the cartridge case; and a magnetic tape wound around the tape reel.

The magnetic tape includes a magnetic layer in which a plurality of servo patterns recorded at intervals in a tape width direction is recorded.

The magnetic layer has a first region in which a servo band pitch that is a distance between two adjacent servo bands is narrower than an arrangement interval of two servo read heads in a tape drive device that records information in the magnetic layer or reproduces information recorded in the magnetic layer, and a second region in which the servo band pitch is wider than the arrangement interval of the two servo read heads.

MODE(S) FOR CARRYING OUT THE INVENTION

An embodiment according to the present technology will be described with reference to the drawings.

<Overall Configuration of System and Configurations of Respective Units>

[Tape Cartridge]

Figure 1:
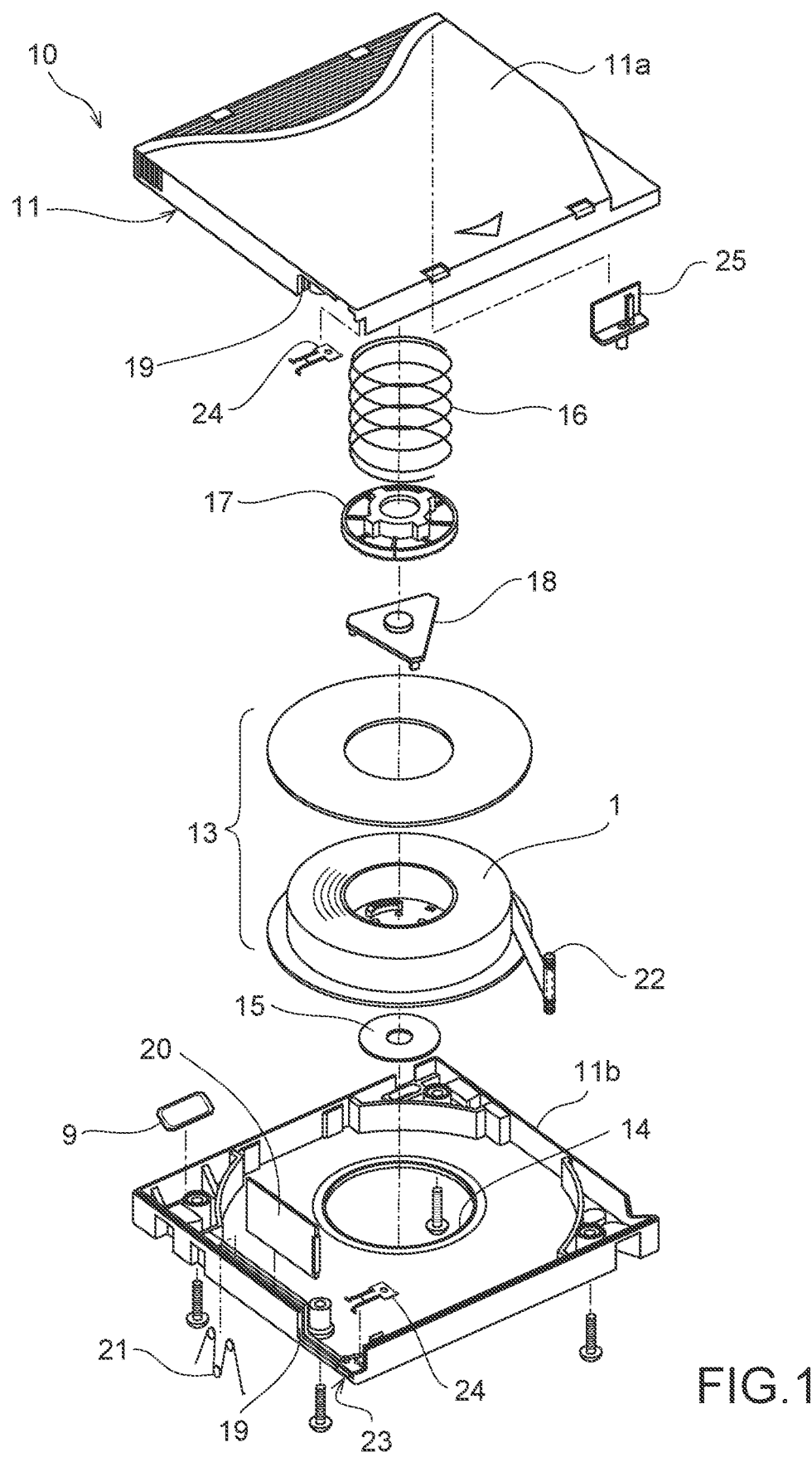
FIG. 1 is an exploded perspective view showing a tape cartridge according to an embodiment of the present technology.

FIG. 1 is an exploded perspective view showing a tape cartridge 10 according to an embodiment of the present technology. In the description of this embodiment, a tape cartridge conforming to the LTO standard will be described as an example of the tape cartridge 10.

As shown in FIG. 1, the tape cartridge 10 includes a cartridge case 11, a tape reel 13, and a magnetic tape 1. The cartridge case 11 is configured by connecting an upper shell 11a and a lower shell 11b with a plurality of screw members. The single tape reel 13 on which the magnetic tape 1 is wound is rotatably housed inside the cartridge case 11.

A chucking gear (illustration omitted) that engages with a spindle 31 (see FIG. 6) of a tape drive device 30 is annularly formed in the center of the bottom portion of the tape reel 13. This chucking gear is exposed to the outside via an opening 14 formed in the center of the lower shell 11b. An annular metal plate 15 that is magnetically attracted to the spindle 31 is fixed to the inner peripheral side of this chucking gear.

A reel spring 16, a reel lock member 17, and a spider 18 are disposed between the inner surface of the upper shell 11a and the tape reel 13. These constitute a reel locking mechanism that prevents the tape reel 13 from rotating when a cartridge 10 is not in use.

A tape outlet 19 for drawing out one end of the magnetic tape 1 to the outside is provided on one side wall portion of the cartridge case 11. A slide door 20 for opening and closing the tape outlet 19 is disposed on the inner side of this side wall portion. The slide door 20 is configured to slide in the direction of opening the tape outlet 19 against the biasing force of a torsion spring 21 by engagement with a tape loading mechanism (not shown) of the tape drive device 30.

A leader pin 22 is fixed to one end portion of the magnetic tape 1. The leader pin 22 is configured to be attachable/detachable to/from a pin holding portion 23 provided on the inner side of the tape outlet 19. The pin holding portion 23 includes elastic holders 24 that elastically holds the upper end portion and the lower end portion of the leader pin 22 on the upper wall inner surface of the cartridge case 11 (inner surface of the upper shell 11a) and the bottom wall inner surface (inner surface of the lower shell 11b).

Then, a safety tab 25 for preventing erroneous erasure of information recorded on the magnetic tape 1 as well as a cartridge memory 9 capable of reading and writing the content relating to the data recorded on the magnetic tape 1 in a non-contact manner are disposed on the inner side of another side wall of the cartridge case 11.

Figure 2:
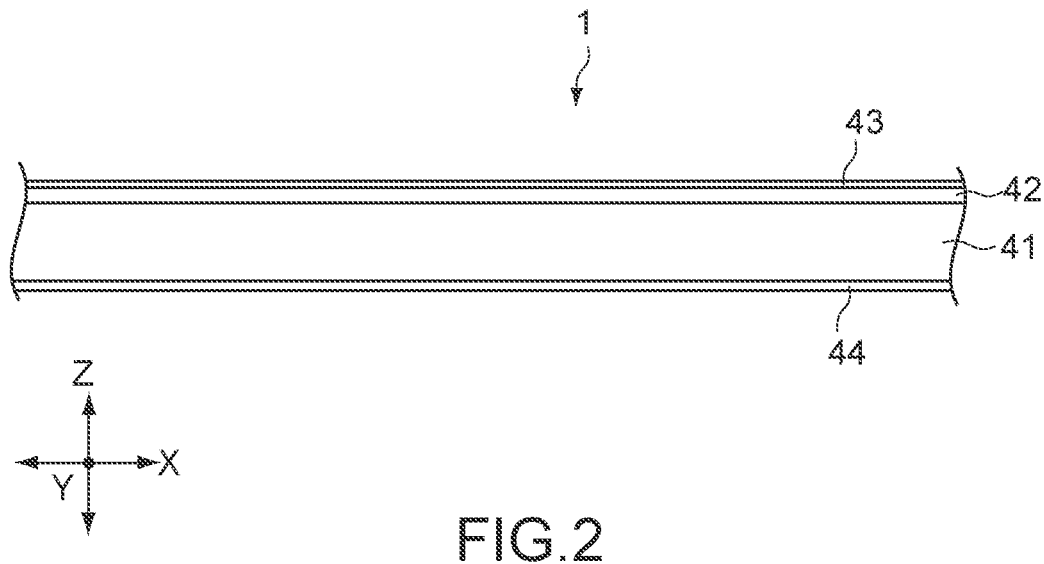
FIG. 2 is a schematic diagram of the magnetic tape according to the embodiment of the present technology when viewed from the side.
Figure 3:
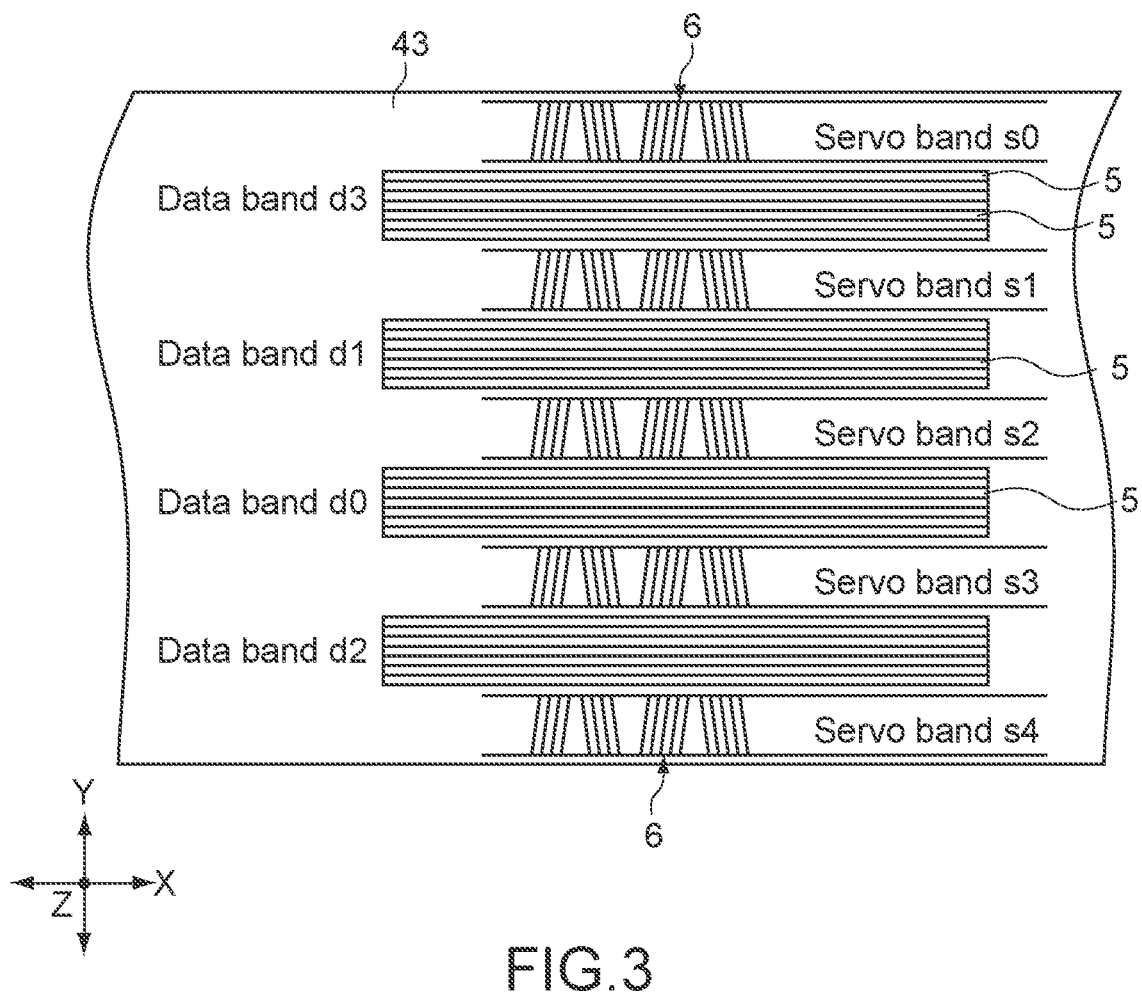
FIG. 3 is a schematic diagram of the magnetic tape when viewed from above (magnetic layer side).

FIG. 2 is a schematic diagram of the magnetic tape 1 when viewed from the side, and FIG. 3 is a schematic diagram of the magnetic tape 1 when viewed from above (magnetic layer 43 side). As shown in FIG. 2 and FIG. 3, the magnetic tape 1 is configured to have a tape shape that is long in the longitudinal direction (X-axis direction), short in the width direction (Y-axis direction), and thin in the thickness direction (Z-axis direction).

The magnetic tape 1 includes a base material 41 having a tape shape long in the longitudinal direction (X-axis direction), an underlayer (non-magnetic layer) 42 provided on one main surface of the base material 41, a magnetic layer 43 provided on the underlayer 42, and a back layer 44 provided on the other main surface of the base material 41. Note that the back layer 44 only needs to be provided as necessary and this back layer 44 may be omitted. The magnetic tape 1 may be a perpendicular recording magnetic recording medium or may be a longitudinal recording magnetic recording medium. Further, the magnetic layer 43 may be a coating film of a magnetic material or may be a deposition film or a sputtering film of a magnetic material.

Note that details of the layers constituting the magnetic tape 1 will be described below.

As shown in FIG. 3, the magnetic layer 43 includes a plurality of data bands d (data bands d0 to d3) long in the longitudinal direction (X-axis direction) in which data is written, and a plurality of servo bands s (servo bands s0 to s4) long in the longitudinal direction in which a servo pattern 6 is written. The servo bands s are arranged at positions sandwiching the respective data bands d in the width direction (Y-axis direction).

In the present technology, the ratio of the area of the servo bands s to the area of the entire surface of the magnetic layer 43 is typically 4.0% or less. Note that the width of the servo band s is set to, for example 96 μm or less in the tape width of ½ inch. The ratio of the area of the servo bands s to the area of the entire surface of the magnetic layer 43 can be measured by, for example, developing the magnetic tape 1 using a developer such as a ferricolloid developer and then observing the developed magnetic tape 1 with an optical microscope.

In the example shown in FIG. 3, the number of data bands d is four and the number of servo bands s is five. Note that the number of data bands d and the number of servo bands s can be changed as appropriate.

The data band d includes a plurality of recording tracks 5 that is long in the longitudinal direction and aligned in the width direction. The number of recording tracks 5 included in one data band d is, for example, approximately 1000 to 2000. Data is recorded in the recording track 5 along this recording track 5. One bit length in the longitudinal direction of the data recorded in the data band d is, for example, 48 nm or less. The servo band s includes the servo pattern 6 having a predetermined shape recorded by a servo pattern recording apparatus (see FIG. 9) described below.

Here, in the magnetic tape 1 according to the LTO standard, the number of recording tracks 5 increases with each generation and the recording capacity is dramatically improved. For example, although the number of recording tracks 5 was 384 in the first LTO-1, the number of recording tracks 5 increased to 512, 704, 896, 1280, 2176, 3584, and 6656 in the LTO-2 to LTO8, respectively. Similarly, although the recording capacity of data was 100 GB (gigabytes) in the LTO-1, the recording capacity of data increased to 200 GB, 400 GB, 800 GB, 1.5 TB (terabytes), 2.5 TB, 6.0 TB, and 12 TB in the LTO-2 to LTO-8, respectively.

In this embodiment, the number of recording tracks 5 and the recording capacity are not particularly limited and can be changed as appropriate. However, for example, it is advantageous to apply the present technology to the magnetic tape 1 that has a large number of recording tracks 5 and high recording capacity (e.g., 6656 or more, 12 TB or more: LTO8 and subsequent LTOs) and is easily affected by fluctuations of the width of the magnetic tape 1.

[Data Band and Servo Band]

Figure 4:
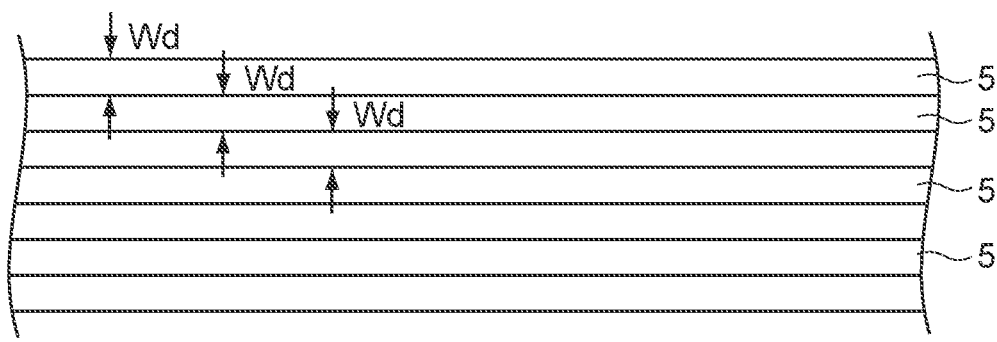
FIG. 4 is an enlarged view showing recording tracks in a data band of the magnetic tape.
Figure 4:
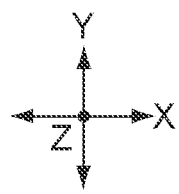

FIG. 4 is an enlarged view showing the recording tracks 5 in the data band d. As shown in FIG. 4, the recording tracks 5 are long in the longitudinal direction and aligned in the width direction and have a predetermined recording track width (track pitch) Wd in the width direction for each track. This recording track width Wd is typically 2.0 μm or less. Note that such a recording track width Wd can be measured by, for example, developing the magnetic layer 43 of the magnetic tape 1 using a developer such as a ferricolloid developer and then observing the magnetic layer 43 of the developed magnetic tape 1 with an optical microscope.

Alternatively, as a measurement method using a drive head, the recording track width Wd can be measured by setting the drive head to a Read While Write state in order to ignore the fluctuations during tape travelling and on the basis of the output change when the Azimuth of the drive head is changed.

(IEEE_Sept1996_Crosstrack Profiles of Thin Film MR Tape Heads Using the Azimuth Displacement Method)

Figure 5:
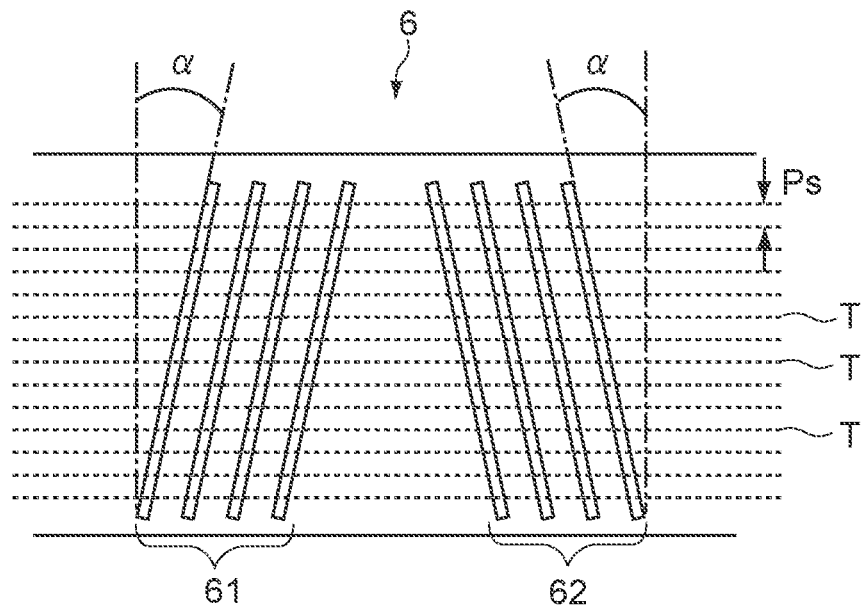
FIG. 5 is an enlarged view of a servo pattern written in a servo band of the magnetic tape.
Figure 5:
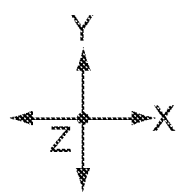

FIG. 5 is an enlarged view showing the servo pattern 6 written in the servo band s. As shown in FIG. 5, the servo pattern 6 includes a plurality of stripes inclined at a predetermined azimuth angle α with respect to the width direction (Y-axis direction), which will be described below. The plurality of stripes is classified into a first stripe group 61 inclined clock wise with respect to the width direction (Y-axis direction) and a second stripe group 62 inclined counterclockwise with respect to the width direction. Each of the first stripe group 61 and the second stripe group 62 typically includes four or five stripes. Note that the shape and the like of the servo pattern 6 can be measured by, for example, developing the magnetic layer 43 of the magnetic tape 1 using a developer such as a ferricolloid developer and then observing the magnetic layer 43 of the developed magnetic tape 1 with an optical microscope.

In FIG. 5, servo trace lines T that are lines traced on the servo pattern 6 by a servo read head 132 (see FIG. 7) described below are indicated by broken lines. The servo trace lines T are set along the longitudinal direction (X-axis direction) and are set at predetermined intervals Ps in the width direction.

The number of servo trace lines T per servo band s is, for example, approximately 30 to 60. The interval Ps between two adjacent servo trace lines T is the same as the value of the recording track width Wd and is, for example, 2.0 μm or less. Here, the interval Ps between two adjacent servo trace lines T is a value that determines the recording track width Wd. That is, when the interval Ps between the servo trace lines T is narrowed, the recording track width Wd becomes smaller, and the number of recording tracks 5 included in one data band d increases. As a result, the recording capacity of data increases.

[Tape Drive Device]

Figure 6:
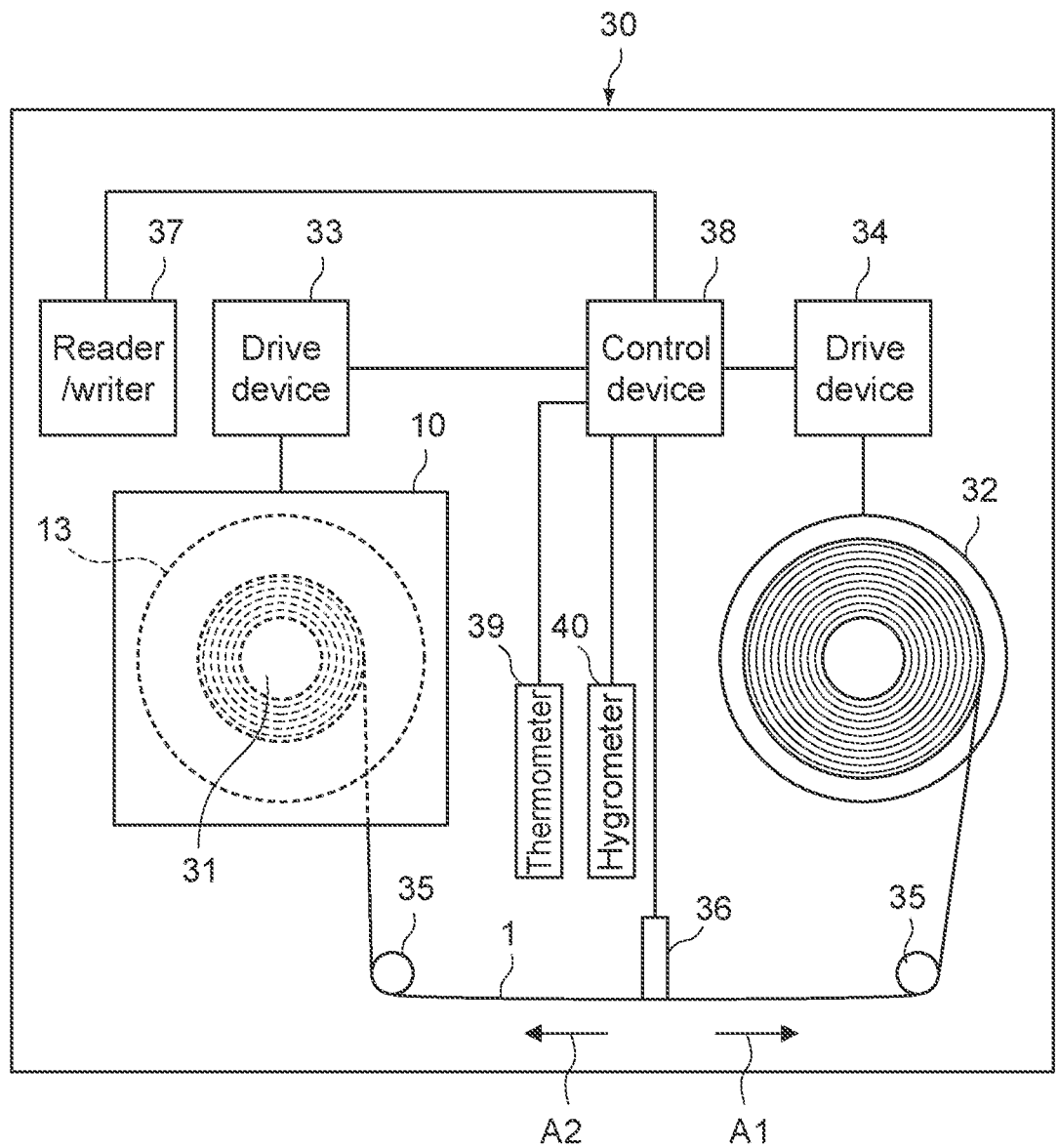
FIG. 6 is a diagram showing a tape drive device.

FIG. 6 is a diagram showing the tape drive device 30. The tape drive device 30 is a data recording/reproduction device capable of recording data on the magnetic tape 1 or reproducing data recorded on the magnetic tape 1.

As shown in FIG. 6, the tape drive device 30 is configured to be capable of loading the cartridge 10. The tape drive device 30 is configured to be capable of loading one cartridge 10 but may be configured to be capable of simultaneously loading a plurality of cartridges 10.

The tape drive device 30 includes the spindle 31, a take-up reel 32, a spindle drive device 33, a reel drive device 34, a plurality of guide rollers 35, a drive head 36, a reader/writer 37, and a control device 38. The tape drive device 30 may further include a thermometer 39, a hygrometer 40, and the like.

The spindle 31 includes a head portion that engages with the chucking gear of the tape reel 13 via the opening 14 formed in the lower shell 11b of the cartridge 10. The spindle 31 raises the tape reel 13 by a predetermined distance against the biasing force of the reel spring 16 to release the reel lock function of the reel lock member 17. As a result, the tape reel 13 is rotatably supported inside the cartridge case 11 by the spindle 31.

The spindle drive device 33 causes the spindle 31 to rotate in accordance with a command from the control device 38. The take-up reel 32 is configured to be capable of fixing the tip (leader pin 22) of the magnetic tape 1 drawn out from the cartridge via the tape loading mechanism (not shown).

The plurality of guide rollers 35 guides the travelling of the magnetic tape 1 such that the tape path formed between the cartridge 10 and the take-up reel 32 has a predetermined relative positional relationship with the drive head 36. The reel drive device 34 causes the take-up reel 32 to rotate in accordance with a command from the control device 38.

When data is recorded/reproduced on the magnetic tape 1, the spindle 31 and the take-up reel 32 are caused to rotate by the spindle drive device 33 and the reel drive device 34 and the magnetic tape 1 travels. Regarding the travelling direction of the magnetic tape 1, the magnetic tape 1 can be reciprocated in the forward direction indicated by an arrow A1 in FIG. 6 (direction of unwinding from the side of the tape reel 13 to the side of the take-up reel 32) and the reverse direction indicated by an arrow A2 (direction of rewinding from the side of the take-up reel 32 to the side of the tape reel 13).

Note that in this embodiment, by controlling the rotation of the spindle 31 by the spindle drive device 33 and the rotation of the take-up reel 32 by the reel drive device 34, the tension in the longitudinal direction (X-axis direction) of the magnetic tape 1 during data recording/reproduction can be adjusted. Note that the tension of the magnetic tape 1 may be adjusted by controlling the movement of the guide roller 35, a tension control unit including a dancer roller, or the like instead of the control of the rotation of the spindle 31 and the take-up reel 32 (or in addition to the control).

The reader/writer 37 is configured to be capable of recording management information on the cartridge memory 9 in accordance with a command from the control device 38. Further, the reader/writer 37 is configured to be capable of reading management information from the cartridge memory 9 in accordance with a command from the control device 38. As the communication method between the reader/writer 37 and the cartridge memory 9, for example, the ISO14443 method is adopted.

The control device 38 includes, for example, a control unit, a storage unit, a communication unit, and the like. The control unit includes, for example, a CPU (Central Processing Unit) or the like, and integrally controls the respective units of the tape drive device 30 in accordance with a program stored in the storage unit.

The storage unit includes a non-volatile memory on which various types of data and various programs are to be recorded, and a volatile memory used as a work area of the control unit. The various programs described above may be read from a portable recording medium such as an optical disc and a semiconductor memory, or may be downloaded from a server apparatus in a network. The storage unit temporarily or non-temporarily stores information of the cartridge memory 9 read from the reader/writer 27, the output of the thermometer 39 and the hygrometer 40, and the like. The communication unit is configured to be capable of communicating with other devices such as a PC (Personal Computer) and a server apparatus.

The drive head 36 is configured to be capable of recording data on the magnetic tape 1 in accordance with a command from the control device 38. Further, the drive head 36 is configured to be capable of reproducing data written to the magnetic tape 1 in accordance with a command from the control device 38.

Figure 7:
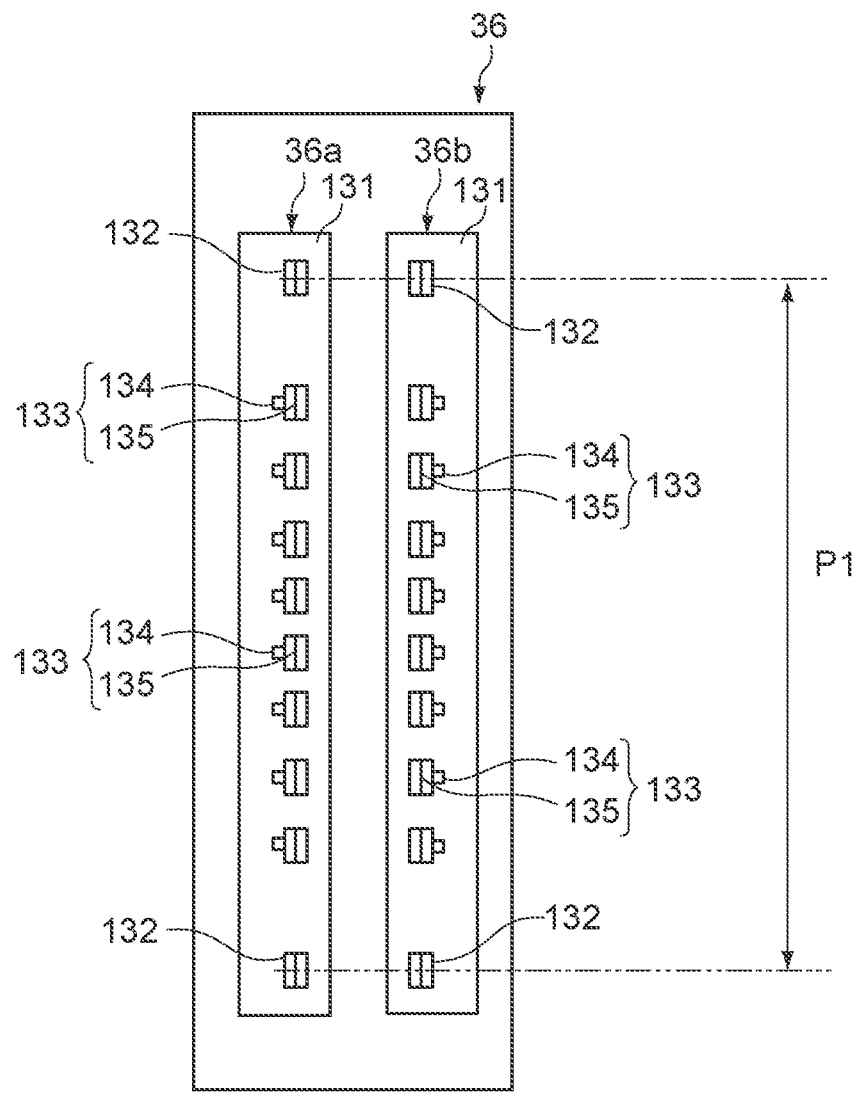
FIG. 7 is a schematic diagram of a drive head in the tape drive device.

The drive head 36 includes, for example, a head unit including two servo read heads, a plurality of data write/read heads, and the like. FIG. 7 is a schematic diagram of the drive head 36 when viewed from below (tape travelling surface).

As shown in FIG. 7, the drive head 36 includes a first drive head unit 36a and a second drive head unit 36b. The first drive head unit 36a and the second drive head unit 36b are configured symmetrically in an X'-axis direction (travelling direction of the magnetic tape 1 (X-axis direction in FIG. 3)). The first drive head unit 36a and the second drive head unit 36b are configured to be movable in the width direction of the magnetic tape 1 (Y-axis direction in FIG. 3).

The first drive head unit 36a is a drive head used when the magnetic tape 1 travels in the forward direction (A1 direction in FIG. 6). Meanwhile, the second drive head unit 36b is a drive head used when the magnetic tape 1 travels in the reverse direction (A2 direction in FIG. 6). Since the first drive head unit 36a and the second drive head unit 36b have basically the same configuration, the first drive head unit 36a will be described as a representative.

The first drive head unit 36a includes a head body 131, two servo read heads 132, and a plurality of data write/read heads 133.

The servo read head 132 is configured to be capable of reproducing a servo signal by reading, by an MR element (MR: Magneto Resistive effect) or the like, the magnetic flux generated from the magnetic information recorded in the servo band s of the magnetic tape 1. That is, the servo signal is reproduced by reading, by the servo read head 132, the servo pattern 6 recorded on the servo band s.

The servo read head 132 is provided on each of both ends of the head body 131 in the width direction (Y'-axis direction in FIG. 7). Examples of the MR element include an anisotropic magneto resistive effect (AMR) element, a giant magneto resistive effect (GMR) element, and a tunnel magneto resistive effect (TMR) element. The distance between the two servo read heads 132 in the width direction (Y'-axis direction) is substantially the same as the distance between adjacent servo bands s in the magnetic tape 1, the details of which will be described below.

The data write/read heads 133 are arranged at regular intervals along the width direction (Y'-axis direction). Further, the data write/read heads 133 are arranged at positions sandwiched between the two servo read heads 132. The number of the data write/read heads 133 is, for example, approximately 20 to 40, but this number is not particularly limited.

The data write/read head 133 includes a data write head 134 and a data read head 135. The data write head 134 is configured to be capable of recording a data signal on the data band d of the magnetic tape 1 by the magnetic field generated from the magnetic gap. Further, the data read head 135 is configured to be capable of reproducing a data signal by reading, by an MR element (MR: Magneto Resistive effect) or the like, the magnetic field generated from the magnetic information recorded in the data band d of the magnetic tape 1. Examples of the MR element include an anisotropic magneto resistive effect (AMR) element, a giant magneto resistive effect (GMR) element, and a tunnel magneto resistive effect (TMR) element.

In the first drive head unit 36*a*, the data write head 134 is disposed on the left side of the data read head 135 (on the upstream side in the case where the magnetic tape 1 flows in the forward direction). Meanwhile, in the second drive head unit 36*b*, the data write head 134 is disposed on the right side of the data read head 135 (on the upstream side in the case where the magnetic tape 1 flows in the reverse direction). Note that the data read head 135 is capable of reproducing, immediately after the data write head 134 writes a data signal to the magnetic tape 1, this data signal.

Figure 8:
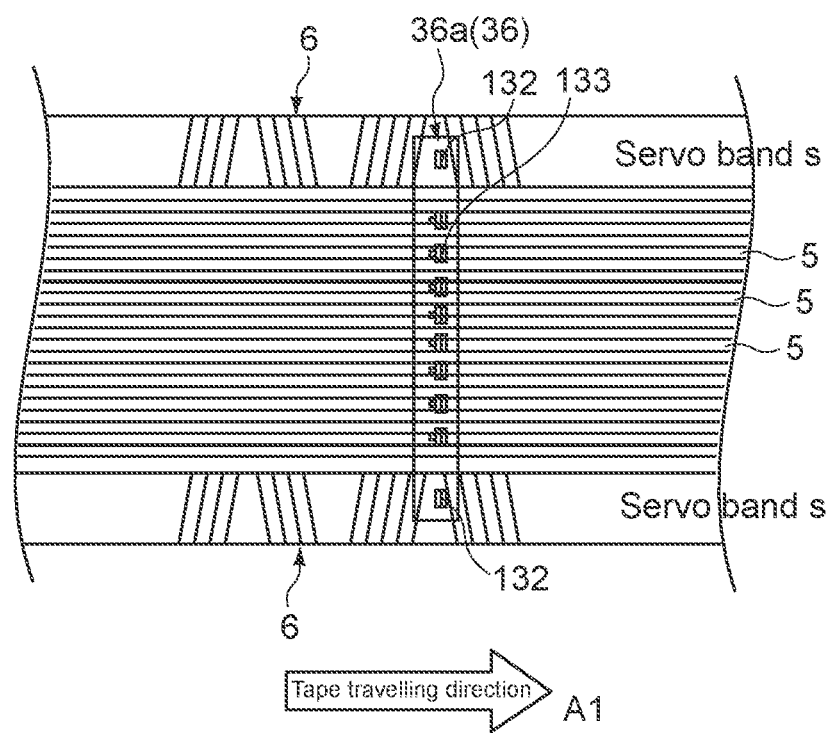
FIG. 8 is a diagram showing how the tape drive device records/reproduces a data signal.
Figure 8:
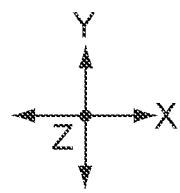

FIG. 8 is a diagram showing how the first drive head unit 36*a* records/reproduces a data signal. Note that the example shown in FIG. 8 shows the magnetic tape 1 travelling in the forward direction (A1 direction).

As shown in FIG. 8, when the first drive head unit 36*a* records/reproduces a data signal, one of the two servo read heads 132 is located on one servo band s of two adjacent servo bands s and reads the servo pattern 6 on this servo band s. Further, the other of the two servo read heads 132 is located on the other servo band s of the two adjacent servo bands s and reads the servo pattern 6 on this servo band s.

The control device 38 determines, on the basis of the reproduced waveform of the servo pattern 6, whether or not the servo read head 132 is accurately tracing the target servo trace line T (see FIG. 5).

This principle will be described. As shown in FIG. 5, the first stripe group 61 and the second stripe group 62 in the servo pattern 6 are inclined in opposite directions with respect to the width direction (Y-axis direction). For this reason, in the servo trace line T on the upper side, the distance between the first stripe group 61 and the second stripe group 62 in the longitudinal direction (X-axis direction) is relatively narrow. Meanwhile, on the servo trace line T on the lower side, the distance between the first stripe group 61 and the second stripe group 62 in the longitudinal direction (X-axis direction) is relatively wide.

For this reason, by obtaining the difference between the time when the reproduced waveform of the first stripe group 61 was detected and the time when the reproduced waveform of the second stripe group 62 was detected, the current position of the servo read head 132 in the width direction (Y-axis direction) with respect to the magnetic tape 1 can be known.

Therefore, the control device 38 is capable of determining, on the basis of the reproduced waveform of the servo pattern 6, whether or not the servo read head 132 is accurately tracing the target servo trace line T. Then, the control device 38 causes, in the case where the servo read head 132 is not accurately tracing the target servo trace line T, the drive head 36 to move in the width direction (Y'-axis direction) to adjust the position of the drive head 36. Note that the measurement method of the servo trace line T traced by the servo read head 132 will be described below with reference to FIG. 23.

Returning to FIG. 8, the data write/read head 133 adjusts, in the case where the magnetic tape 1 fluctuates in the width direction during travelling of the magnetic tape 1, the position so as to be along the servo trace line T and records a data signal in the recording track 5.

Here, when the magnetic tape 1 is completely drawn out from the tape cartridge 10, the magnetic tape 1 is caused to travel in the reverse direction (A2 direction). At this time, as the drive head 36, the second drive head unit 36*b* is used. As the servo trace line T, the servo trace line T adjacent to the previous servo trace line T is used. In this case, the drive head 36 is caused to move in the width direction (Y'-axis direction) by the interval Ps of the servo trace line T (=the recording track width Wd). In this case, a data signal is recorded on the recording track 5 adjacent to the recording track 5 on which a data signal was previously recorded.

In this way, a data signal is recorded on the recording track 5 while the magnetic tape 1 is reciprocated many times by changing the travelling direction between the forward direction and the reverse direction. For example, assumption is made that the number of servo trace lines T is 50 and the number of data write/read heads 133 included in the first drive head unit 36*a* (or the second drive head unit 36*b*) is 32. In this case, the number of recording tracks 5 included in one data band d is 50×32=1600, and it is necessary to reciprocate the magnetic tape 1 25 times in order to record a data signal in all the recording tracks 5.

[Servo Pattern Recording Apparatus]

Figure 9:
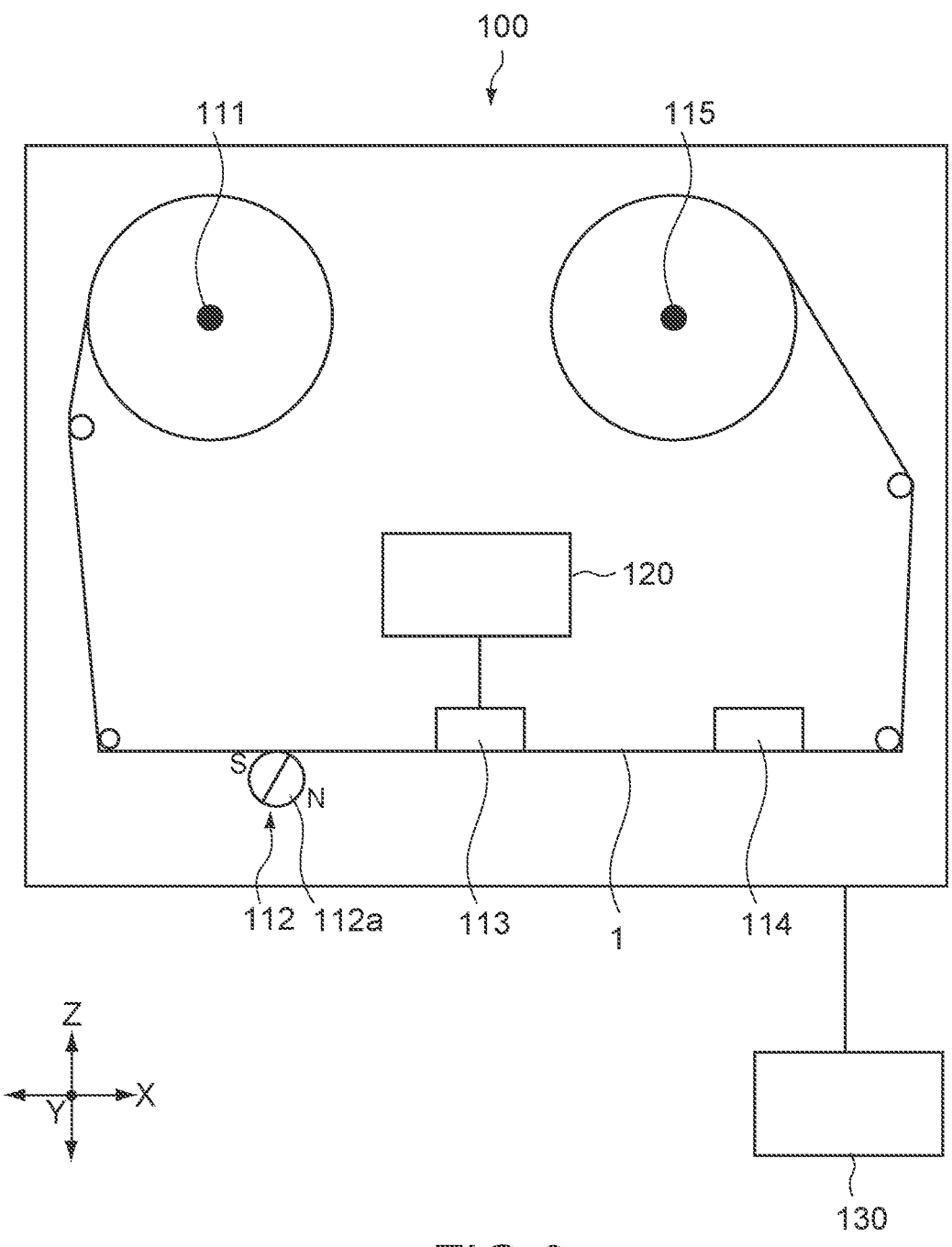
FIG. 9 is a front view showing a servo pattern recording apparatus according to an embodiment of the present technology.
Figure 10:
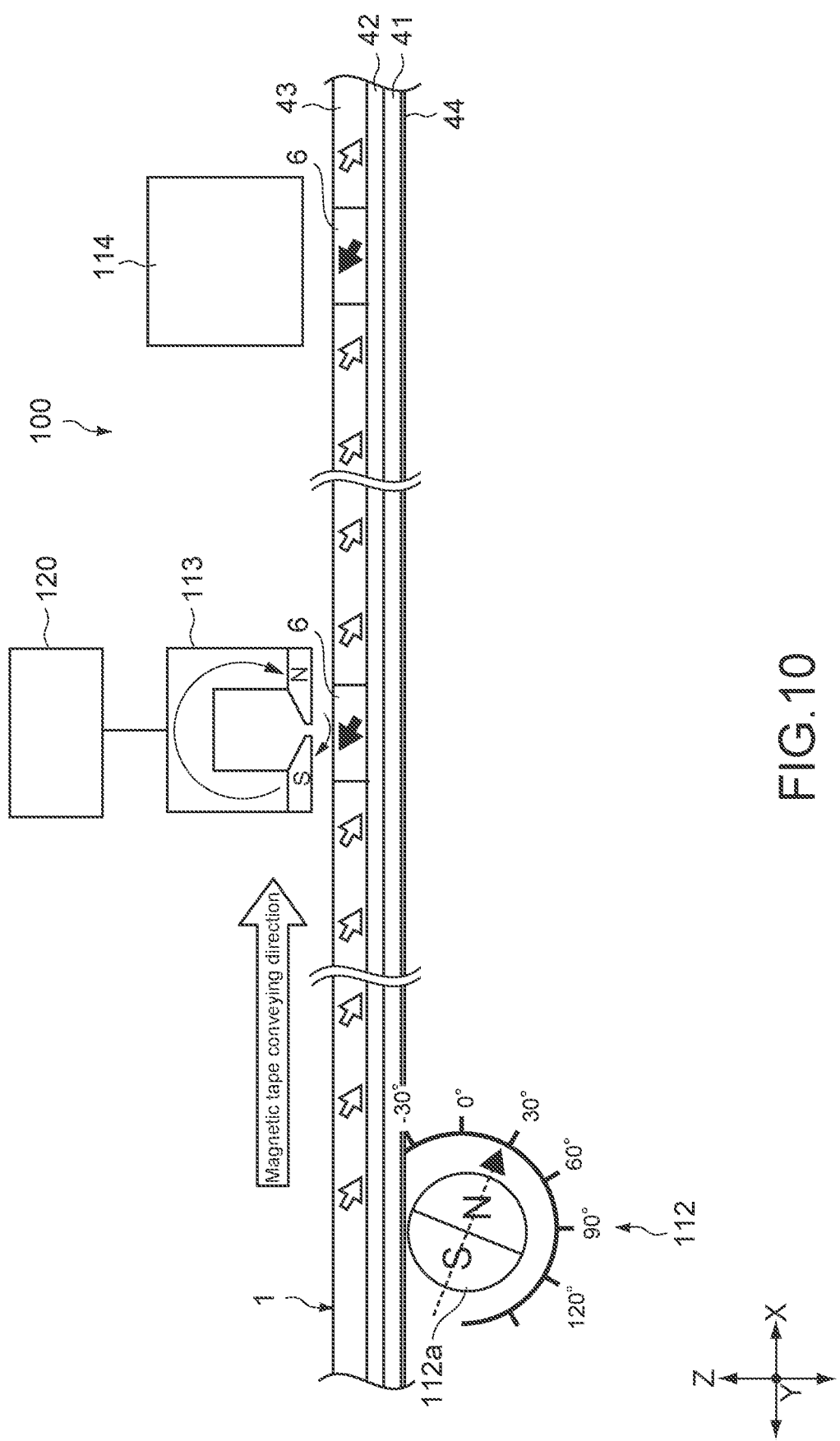
FIG. 10 is a partial enlarged view showing part of the servo pattern recording apparatus.

Subsequently, a configuration of a servo pattern recording apparatus that records the servo pattern 6 in the servo band s of the magnetic tape 1 will be described. FIG. 9 is a front view showing a servo pattern recording apparatus 100 according to an embodiment of the present technology. FIG. 10 is a partial enlarged view showing part of the servo pattern recording apparatus 100.

The servo pattern recording apparatus 100 includes a feed roller 111, a pre-processing unit 112, a servo write head 113, a reproduction head unit 114, and a winding roller 115 in the stated order from the upstream side in a conveying direction of the magnetic tape 1. The servo pattern recording apparatus 100 further includes a drive unit 120 and a controller 130. The controller 130 includes a control unit that integrally controls the respective units of the servo pattern recording apparatus 100, a recording unit that stores various programs and various types of data required for processing of the control unit, a display unit that displays data, an input unit that inputs data, and the like.

The feed roller 111 is capable of rotatably supporting the magnetic tape 1 having a roll shape (before recording the servo pattern 6). The feed roller 111 is caused to rotate in accordance with driving of the drive source such as a motor and feeds the magnetic tape 1 toward the downstream side in accordance with the rotation.

The winding roller 115 is capable of rotatably supporting the magnetic tape 1 having a roll shape (after recording the servo pattern 6). The winding roller 115 rotates in synchronization with the feed roller 111 in accordance with driving of the drive source such as a motor and winds the magnetic tape 1 in which the servo pattern 6 is recorded in accordance with the rotation. The feed roller 111 and the winding roller 115 are capable of causing the magnetic tape 1 to move at constant speed on the conveying path.

The servo write head 113 is disposed on the upper side (on the side of the magnetic layer 43) of the magnetic tape 1, for example. Note that the servo write head 113 may be disposed on the lower side (on the side of the base material 41) of the magnetic tape 1. The servo write head 113 generates a magnetic field at predetermined timing in accordance with a pulse signal of a square wave and applies the magnetic field to part of the magnetic layer 43 (after the pre-processing) of the magnetic tape 1.

As a result, the servo write head 113 magnetizes part of the magnetic layer 43 in a first direction to record the servo pattern 6 in the magnetic layer 43 (see the black arrow in FIG. 10 for the magnetization direction). The servo write head 113 is capable of recording, when the magnetic layer 43 passes by the lower side of the servo write head 113, the servo pattern 6 in each of the five servo bands s0 to s4.

The first direction that is the magnetization direction of the servo pattern 6 includes a perpendicular component perpendicular to the upper surface of the magnetic layer 43. That is, in this embodiment, the magnetic layer 43 includes perpendicularly oriented or non-oriented magnetic powder, and thus, the servo pattern 6 to be recorded in the magnetic layer 43 includes a perpendicular magnetization component.

The pre-processing unit 112 is disposed on the lower side (on the side of the base material 41) of the magnetic tape 1 on the upstream side of the servo write head 113, for example. The pre-processing unit 112 may be disposed on the upper side (on the side of the magnetic layer 43) of the magnetic tape 1. The pre-processing unit 112 includes a permanent magnet 112a rotatable about the Y-axis direction (width direction of the tape 1) as the central axis of rotation. The shape of the permanent magnet 112a is, for example, a columnar shape or a polygonal columnar shape, but is not limited thereto.

The permanent magnet 112a applies, before the servo write head 113 records the servo pattern 6, a magnetic field to the entire magnetic layer 43 by a DC magnetic field to demagnetize the entire magnetic layer 43. As a result, the permanent magnet 112a is capable of magnetizing the magnetic layer 43 in advance in a second direction that is a direction opposite to the magnetization direction of the servo pattern 6 (see the white arrows in FIG. 10). By making the two magnetization directions opposite to each other in this way, it is possible to make the reproduced waveform of the servo signal obtained by reading the servo pattern 6 symmetrical in the vertical direction (+).

Note that as a method of adjusting the second direction described above, for example, the rotation angle of the permanent magnet 112a may be made arbitrary, the entire magnetic layer 43 may be demagnetized, and then, the servo pattern 6 may be recorded in the magnetic layer 43, thereby adjusting, on the basis of the inclination of the reproduced waveform, the rotation angle of the permanent magnet 112a about the width direction of the magnetic tape 1.

The reproduction head unit 114 is disposed on the upper side (on the side of the magnetic layer 43) of the magnetic tape 1 on the downstream side of the servo write head 113. The reproduction head unit 114 reads the servo pattern 6 from the magnetic layer 43 of the magnetic tape 1 that is pre-processed by the pre-processing unit 112, the servo pattern 6 being recorded on the magnetic tape 1 by the servo write head 113. The reproduced waveform of the servo pattern 6 read by the reproduction head unit 114 is displayed on the screen of the display unit. Typically, the reproduction head unit 114 detects magnetic flux generated from the surface of the servo band s when the magnetic layer 43 passes by the lower side of the reproduction head unit 114. The magnetic flux detected at this time is the reproduced waveform of the servo pattern 6 as a servo signal.

[Servo Pattern]

Subsequently, details of the servo pattern 6 will be described. The servo pattern 6 has a data structure conforming to the "ECMA-319 standard". Part (A) of FIG. 11 is a diagram showing a data structure of an LPOS word embedded in the servo pattern 6, and Part (B) of FIG. 11 is a diagram describing a manufacturer word.

Figure 11:
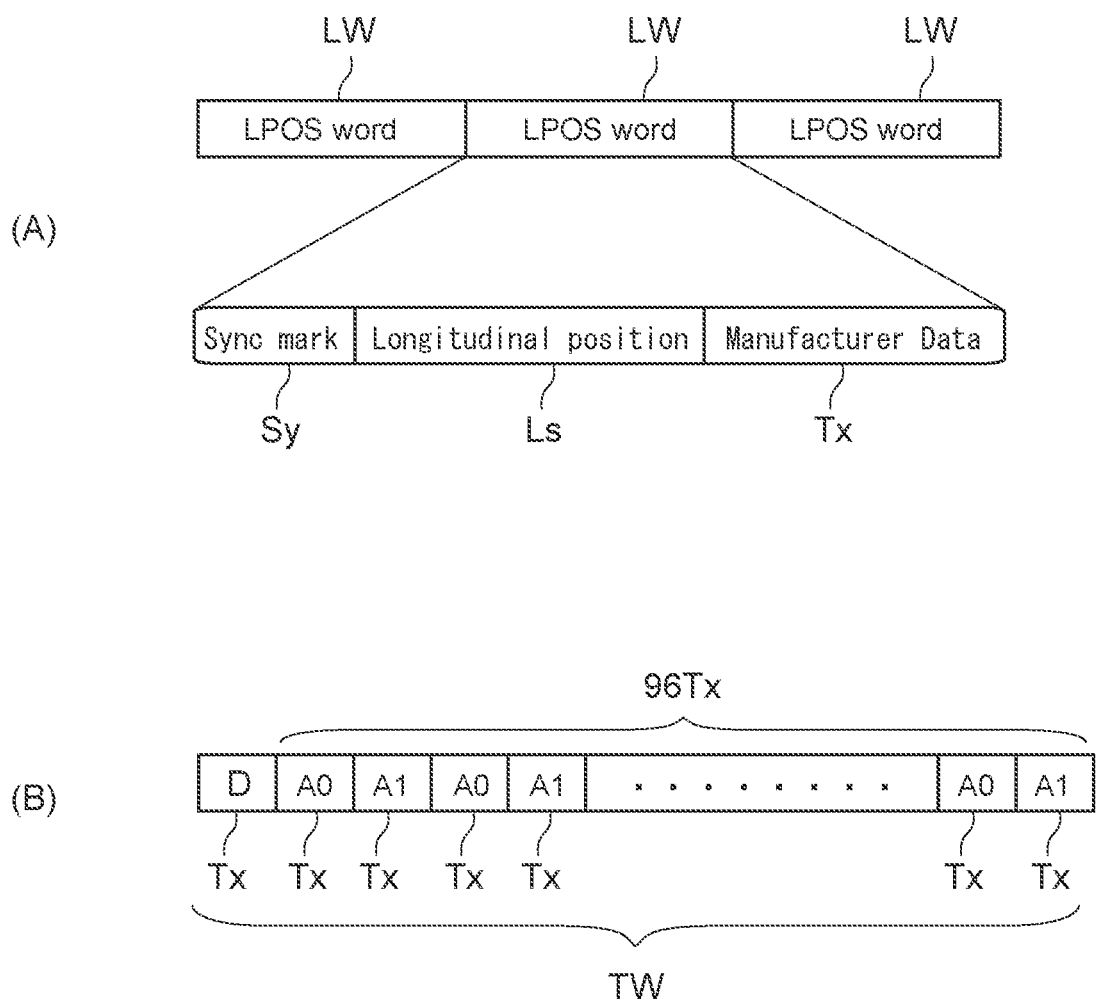
FIG. 11 Part (A) of FIG. 11 is a diagram showing a data structure of an LPOS word embedded in the servo pattern and Part (B) of FIG. 11 is a diagram describing a manufacturer word.

As shown in Part (A) of FIG. 11, a plurality of LPOS (Longitudinal position) words LW continuously arranged in the tape longitudinal direction are embedded in the servo pattern 6. Each of the LPOS words LW includes 36-bit data including an 8-bit synchronization mark Sy meaning the head, six 4-bit LPOS values Ls (total of 24 bits) each indicating the position (address) in the tape longitudinal direction, and 4-bit manufacturer data Tx.

The manufacturer data Tx forms a manufacturer word TW on the magnetic tape 1. As shown in Part (B) of FIG. 11, the manufacturer word TW has a length of 97 pieces of manufacturer data Tx and can be obtained by continuously reading the 97 LPOS words LW. The manufacturer word TW is configured as follows.

Manufacturer word TW: D, A0, A1, A0, A1, . . . , A0, A1

"D" that is the first manufacturer data Tx is a symbol indicating that it is the head of the manufacturer word TW, and 4-bit data (typically, "0001") converted by a predetermined table is written in it.

The second and subsequent 96 pieces of manufacturer data Tx include "A0" and "A1" alternately arranged, and two adjacent "A0" and "A1" form a symbol pair. One of arbitrary 13 basic symbols (typically, 0, 1, 2, 3, 4, 5, 6, 7, 8, 9, A, B, and C) other than "D" is written in each symbol pair "A0" and "A1". Each of the 13 basic symbols also includes 4-bit data converted by the predetermined table described above. Then, one symbol (hereinafter, referred to also as an LPOS recording value) determined in accordance with the combination of specific two basic symbols (corresponding to the symbol pair described above) of the 13 basic symbols is specified.

The LPOS recording value includes 8-bit data. Two basic symbols that form a symbol pair may be a combination of the same symbols (e.g., 0 and 0) or may be a combination of different symbols (e.g., 0 and 1).

Servo band identification information for identifying the servo band, and the like as well as manufacturer information represented by the LPOS recording value and management information such as the date of manufacture and serial number of the magnetic tape are typically embedded in the 96 pieces of manufacturer data Tx configured as described above.

Figure 12:
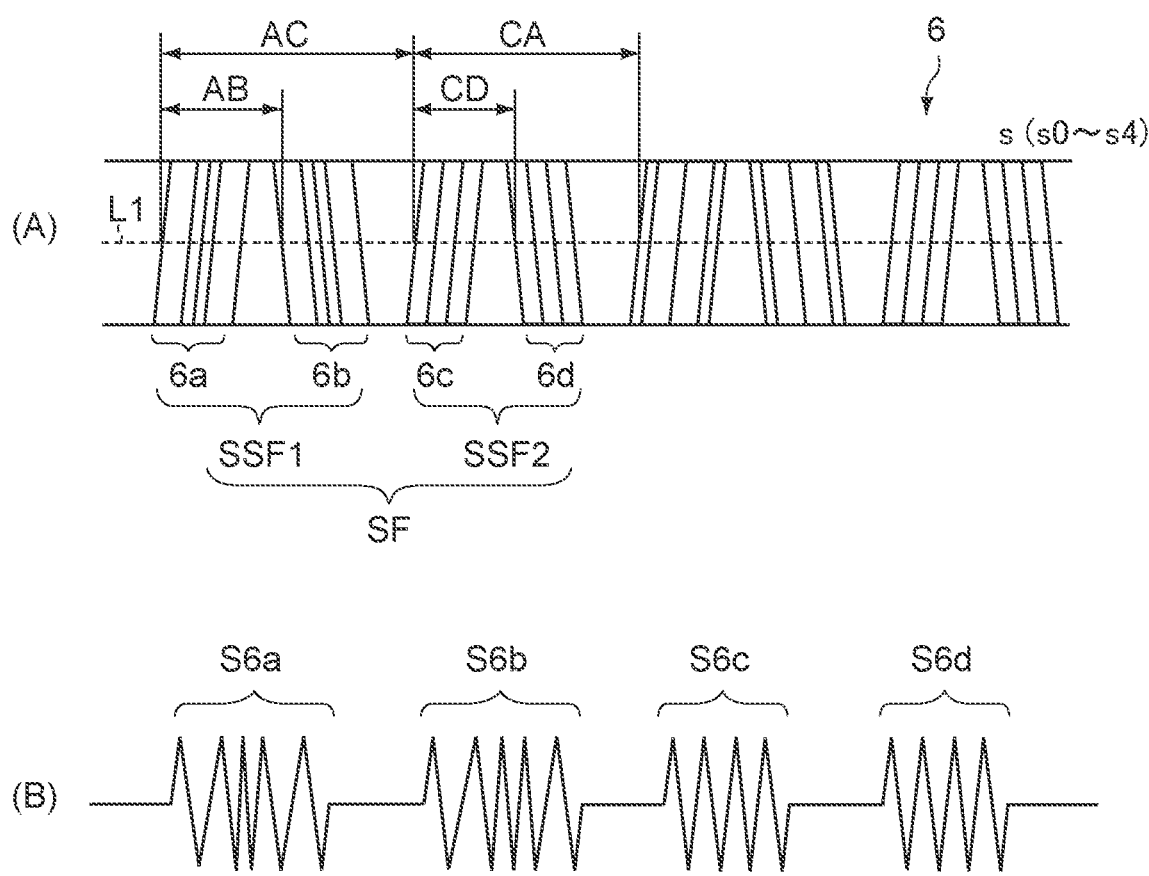
FIG. 12 Part (A) of FIG. 12 is a schematic plan view showing an arrangement example of the servo pattern 6 and Part (B) of FIG. 12 is a diagram showing a reproduced waveform thereof.

Part (A) of FIG. 12 is a schematic plan view showing an arrangement example of the servo pattern 6 and Part (B) of FIG. 12 is a diagram showing the reproduced waveform.

In a timing-based servo type head tracking servo, the servo pattern includes a plurality of azimuthal slope patterns of two or more different shapes. The position of the servo read head 132 is recognized on the basis of the time interval between reading two inclined patterns with different shapes and the time interval between reading two inclined patterns with the same shape. The position of the drive head 36 in the width direction of the magnetic tape 1 (Y-axis direction) is controlled on the basis of the position of the servo read head 132 thus recognized (see FIGS. 7 and 8).

As shown in Part (A) of FIG. 12, the servo pattern 6 forms servo frames SF each including a first servo sub-frame SSF1 and a second servo sub-frame SSF2. The servo frames SF are continuously arranged at predetermined intervals along the tape longitudinal direction. Each of the servo frames SF encodes one bit of "1" or "0". That is, one servo frame SF corresponds to one bit.

The first servo sub-frame SSF1 includes an A burst 6a and a B burst 6b. The A burst 6a includes five linear patterns inclined in the first direction with respect to the tape longitudinal direction (corresponding to the first stripe group 61 in FIG. 5), and the B burst 6b includes five linear patterns inclined in the second direction opposite to the first direction with respect to the tape longitudinal direction (corresponding to the second stripe group 62 in FIG. 5).

Meanwhile, the second servo sub-frame SSF2 includes a C burst 6c and a D burst 6d. The C burst 6c includes four linear patterns inclined in the first direction described above (corresponding to the first stripe group 61 in FIG. 5) and the D burst 6*d* includes four linear patterns inclined in the second direction (corresponding to the second stripe group 62 in FIG. 5).

The lengths of the servo frame SF and each of the servo sub-frames SSF1 and SSF2, the arrangement intervals of the inclined portions that inclining the respective bursts 6*a* to 6*d*, and the like can be arbitrarily set in accordance with the types, specifications, and the like of the magnetic tape.

The reproduced waveform of the servo pattern 6 typically exhibits a burst waveform as shown in Part (B) of FIG. 12, and a signal S6*a*, a signal S6*b*, a signal S6*c*, and a signal S6*d* respectively correspond to the A burst 6*a*, the B burst 6*b*, the C burst 6*c*, and the D burst 6*d*.

In the timing-based servo type head tracking servo, a position error signal (PES) is generated by reading the servo pattern 6 on two servo bands adjacent to one data band, and a recording/reproducing head is suitably positioned with respect to the recording track in the data band. Typically, the servo pattern 6 is read from the magnetic tape 1 travelling at a predetermined speed, a ratio of a distance (time interval) AC between the A burst 6*a* and the C burst 6*c* that are an array of inclined patterns having the same shape and a distance (time interval) AB between the A burst 6*a* and the B burst 6*b* that are an array of inclined patterns having different shapes (or a ratio of a distance CA between the C burst 6*c* and the A burst 6*a* and a distance CD between the C burst 6*c* and the D burst 6*d*) is calculated, and the drive head 36 is caused to move in the tape width direction (Y-axis direction) such that the value equals to a setting value determined for each recording track (see FIG. 8).

[Specification of Data Band]

A different combination of pieces of servo band identification information for each data band is written to each of the servo bands s (s0 to s4). For example, the combination of pieces of servo band identification information obtained from the two servo bands s2 and s3 adjacent to the data band d0 is different from the combination of pieces of servo band identification information obtained from the servo bands s1 and s2 adjacent to the data band d1, the combination of pieces of servo band identification information obtained from the servo bands s3 and s4 adjacent to the data band d2, and the combination of pieces of servo band identification information obtained from the servo bands s0 and s1 adjacent to the data band d3. By making servo band identification information obtained from two servo bands adjacent to one data band different from servo band identification information obtained from two servo bands adjacent to another data band in this way, it is possible to specify the individual data band.

In this embodiment, two types of servo bands are used to specify the data bands d0 to d4 to be recorded and reproduced. As described above, servo band identification information is embedded in the servo band. The servo band identification information is information of a plurality of bits and is embedded at a predetermined position in the second and subsequent 96 pieces of manufacturer data Tx in the manufacturer word TW. The servo band identification information has typically four bits but may have eight bits (combination of the symbol pair "A0" and "A1") or a plurality of bits other than the four bits and eight bits.

In this embodiment, the two types of servo bands described above include a first servo band in which first servo band identification information is recorded and a second servo band in which second servo band identification information is recorded. The first servo band identification information is 4-bit information (e.g., "1001"). The second servo band identification information is 4-bit information (e.g., "0111") different from the first servo band identification information.

The combination of codes "0" and "1" forming the first and second servo band identification information is identified on the basis of the reproduced waveform of the servo pattern 6. That is, the reproduced waveform of the servo pattern 6 corresponds to the modulation waves of the codes "0" and "1", and the first and second servo band identification information is read by demodulating the reproduced waveform and combining four bits, for example. The first and second servo band identification information will be described below with reference to FIG. 13 and FIG. 14.

Figure 13:
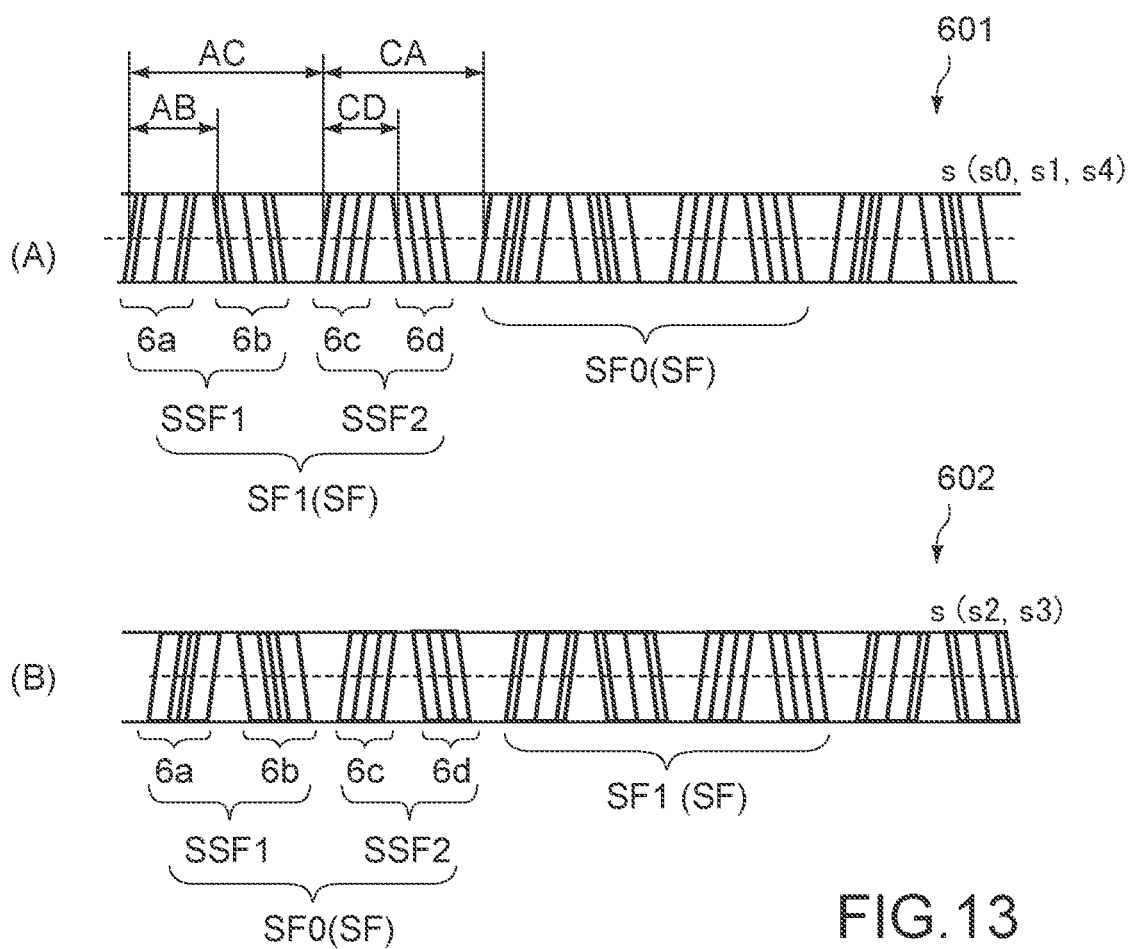
FIG. 13 is a schematic diagram showing a configuration example of a first servo pattern and a second servo pattern.

Parts (A) and (B) of FIG. 13 are each a schematic diagram showing a configuration example of a servo pattern in which the first servo band identification information is embedded (hereinafter, referred to also as a first servo pattern 601) and a servo pattern in which the second servo band identification information is embedded (hereinafter, referred to also as a second servo pattern 602). As shown in the figure, both the first servo pattern 601 and the second servo pattern 602 include a combination of two types of servo frames SF including a servo frame SF1 that represents one code (e.g., "1") and a servo frame SF0 that represents the other code (e.g., "0"). The servo frames SF1 and SF0 are common in that the servo frame SF including the first servo sub-frame SSF1 and the second servo sub-frame SSF2 is a constituent unit, but the first servo sub-frames SSF1 (the A burst 6*a* and the B burst 6*b*) are different from each other.

As shown in Part (A) of FIG. 13, when five inclined patterns forming each of the A burst 6*a* and the B burst 6*b* are defined as a first inclined portion, a second inclined portion, a third inclined portion, a fourth inclined portion, and a fifth inclined portion in the stated order from the left side of the figure in the servo frame SF1 representing the code "1", the second and fourth inclined portions are arranged at positions deviated toward the first and fifth inclined portions, respectively. Meanwhile, as shown in Part (B) of FIG. 13, in the servo frame SF0 representing the code "0", the arrangement intervals of some of the inclined patterns forming the A burst 6*a* and the B burst 6*b* are different from those of the servo frame SF1. In the illustrated example, regarding five inclined patterns forming each of the A burst 6*a* and the B burst 6*b*, both the second and fourth inclined portions are arranged at positions deviated toward the third inclined portion. For this reason, regarding the A burst 6*a* and the B burst 6*b* in the servo frame SF0, the interval between the second inclined portion and the third inclined portion and the interval between the third inclined portion and the fourth inclined portion are the shortest, and the interval between the first inclined portion and the second inclined portion and the interval between the fourth inclined portion and the fifth inclined portion are the longest.

Figure 14:
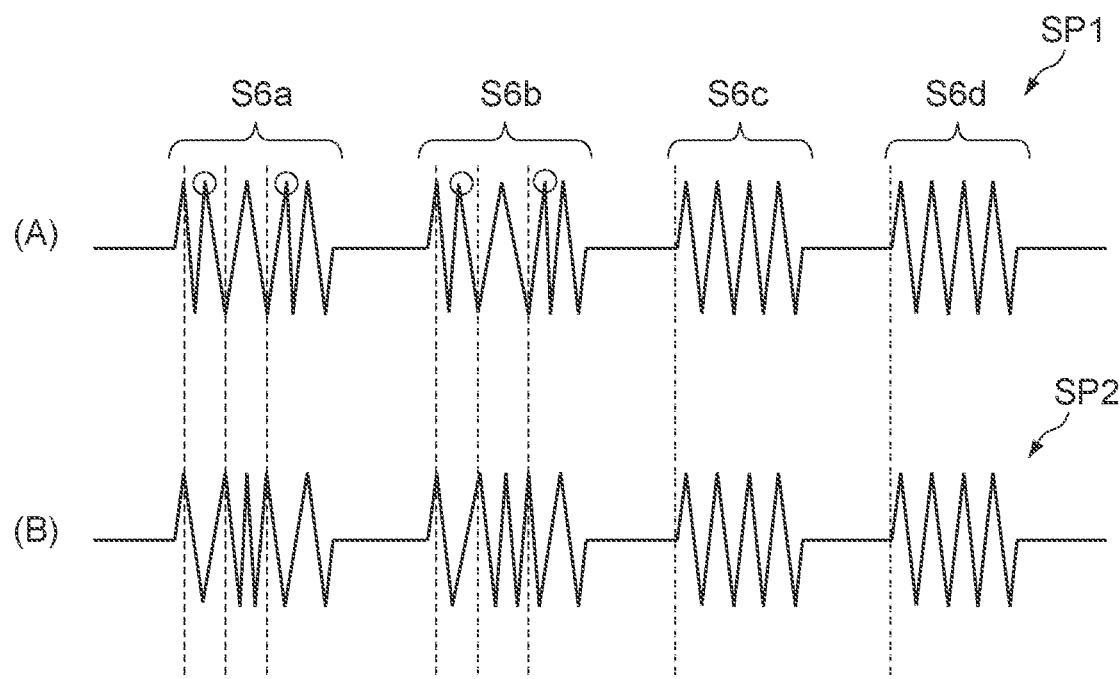
FIG. 14 is a diagram showing reproduced waveforms of the first servo pattern and the second servo pattern.

Parts (A) and (B) of FIG. 14 respectively show reproduced waveforms SP1 and SP2 of the first servo pattern 601 and the second servo pattern 602. The reproduced waveform of each of the servo frames SF1 and SF0 includes a burst signal having a peak at a position corresponding to the inclined portion of each of the bursts 6*a* to 6*d*. As described above, in the servo frame SF0, since the configurations of the A burst 6*a* and the B burst 6*b* are different from those of the A burst 6*a* and the B burst 6*b* of the servo frame SF1, the peak positions of the burst signals S6*a* and S6*b* are deviated corresponding to the intervals of the different inclined portions. Therefore, information written in the servo frame SF can be read by detecting sites where the peak positions are deviated, the amount of deviation, and the deviation direction. Here, for example, the servo frame SF1 shown in Part (A) of FIG. 14 represents one bit "1", and the servo frame SF0 shown in Part (B) of FIG. 14 represents another one bit "0". The first and second servo band identification information can be configured by arbitrarily combining four bits of the two servo frames SF1 and SF0, for example.

Figure 15:
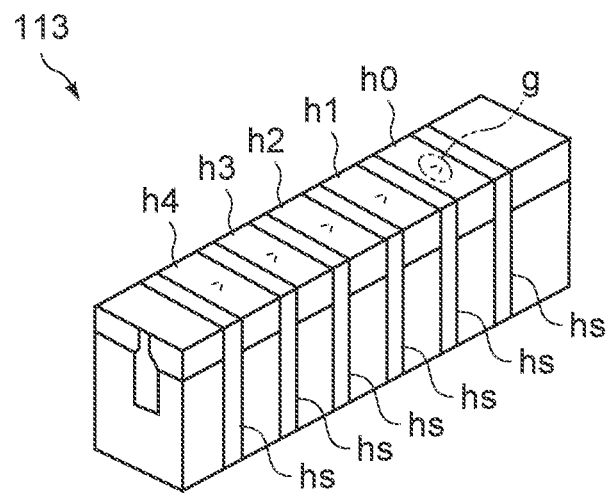
FIG. 15 is a perspective view schematically showing a configuration of a servo write head in the servo pattern recording apparatus.
Figure 16:
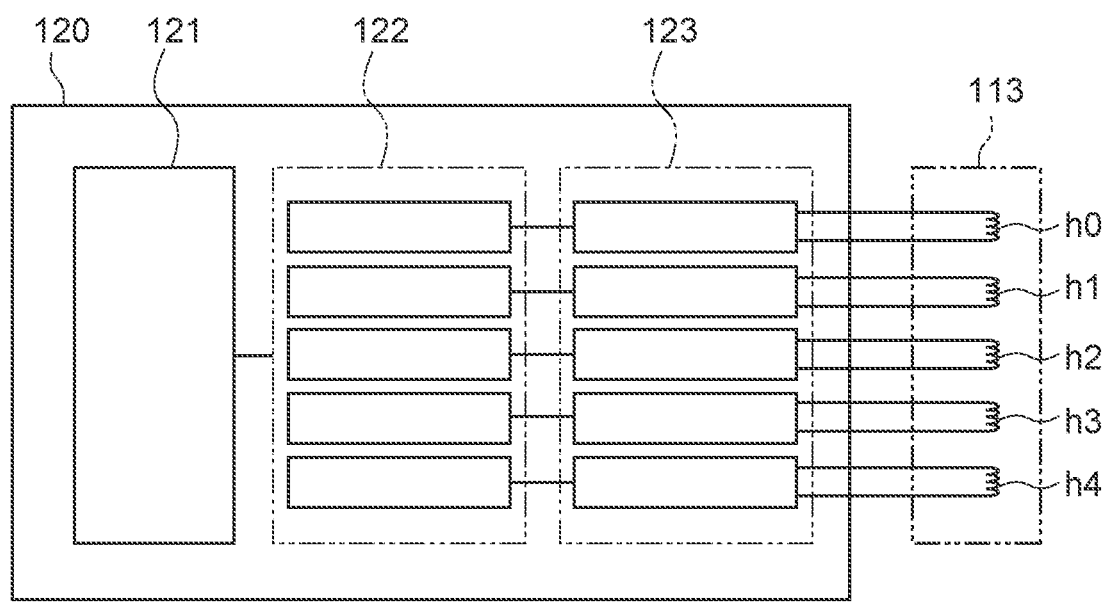
FIG. 16 is a block diagram showing a configuration of a drive unit in the servo pattern recording apparatus.

As shown in FIG. 10, the servo pattern recording apparatus 100 includes the drive unit 120 that drives the servo write head 113. FIG. 15 is a perspective view schematically showing a configuration of the servo write head 113, and FIG. 16 is a block diagram showing a configuration of the drive unit 120. As shown in FIG. 15, the servo write head 113 includes a plurality of head blocks h0 to h4 for recording the servo pattern 6 in each of the servo bands s0 to s4 of the magnetic tape 1. The head blocks h0 to h4 are joined to each other via an adhesive layer hs. The head blocks h0 to h4 constitute a recording unit disposed corresponding to the servo bands s0 to s4 of the magnetic tape 1 and each have a magnetic gap g for recording a servo pattern in each servo band.

The magnetic gap g includes a pair of straight portions ("/" and "Ψ") inclined in direction opposite to each other. One linear portion "/" records the A burst 6a and the C burst 6c, and the other linear portion "Ψ" records the B burst 6b and the D burst 6d. The magnetic gaps g of the head blocks h1 to h5 are arranged so as to be aligned on axis lines parallel to the longitudinal direction of the servo write head 113. The head blocks h0 to h4 are magnetically separated from each other and are configured to be capable of recording different types of servo patterns 6 in two or more servo bands at the same time.

As shown in FIG. 16, the drive unit 120 includes a converter 121 that converts, on the basis of the output from the controller 130 (see FIG. 9), servo information into pulse information, a signal generation unit 122 that generates a pulse signal on the basis of the output of the converter 121, and an amplifier 123 that amplifies the generated pulse signal. The signal generation unit 122 and the amplifier 123 respectively include signal generation units 122 and amplifiers 123 provided corresponding to the respective head blocks h0 to h4 and are configured to be capable of outputting a unique pulse signal to the respective head blocks h0 to h4 of the servo write head 113.

The controller 130 includes a memory storing data regarding the position (s0, s1, and s4 in this example) of the servo band in which the first servo band identification information is to be recorded and the position (s2 and s3 in this example) of the servo band in which the second servo band identification information is to be recorded. The controller 130 controls the drive unit 120 on the basis of the data stored in the memory.

The converter 121 individually outputs information corresponding to the servo band identification information to be recorded in the respective servo bands s0 to s4 to the signal generation unit 122 corresponding to the head blocks h0 to h4. In this embodiment, the converter 121 outputs a first pulse signal PS1 for recording the first servo pattern 601 (Part (A) of FIG. 13) including the first servo band identification information to the head blocks h0, h1, and h4 corresponding to the servo bands s0, s1, and s4, and outputs a second pulse signal PS2 for recording the second servo pattern 602 (Part (B) of FIG. 13) including the second servo band identification information to the second head blocks h2 and h3 corresponding to the servo bands s2 and s3.

Figure 17:
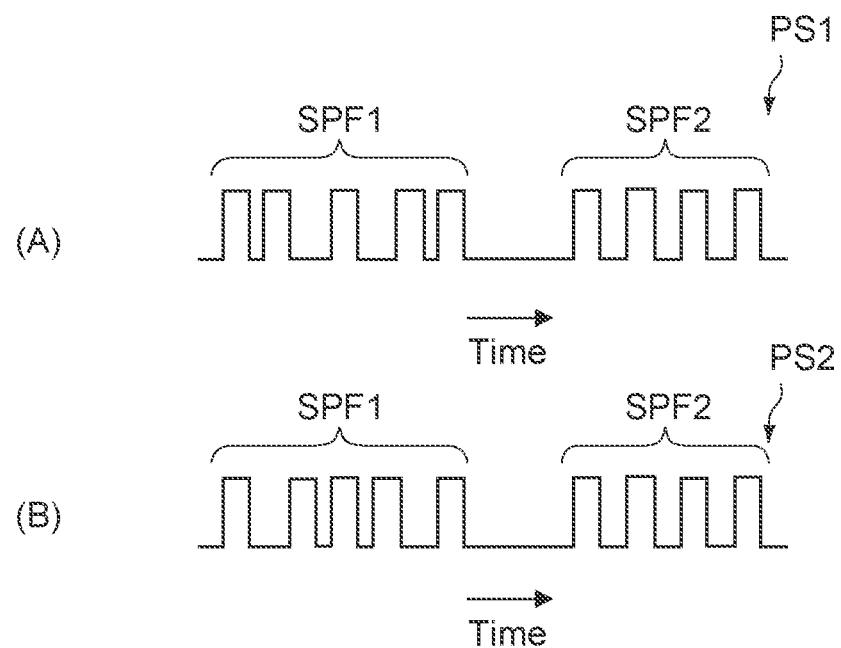
FIG. 17 is a diagram schematically showing recording signal waveforms of a first servo subframe in a first pulse signal and a second pulse signal.

Parts (A) and (B) of FIG. 17 schematically show recording signal waveforms of the first servo sub-frame SSF1 in the first pulse signal PS1 and the second pulse signal PS2, respectively. As shown in the figure, the first and second pulse signals PS1 and PS2 each include a first pulse group SPF1 including five pulse groups and a second pulse group SPF2 including four pulse groups. The first pulse group SPF1 is a signal for recording the respective inclined portions of the A burst 6a, and the second pulse group SPF2 is a signal for recording the respective inclined portions of B burst 6b.

As shown in the figure, the second and fourth pulse rise times in the first pulse group SPF1 are different between the first pulse signal PS1 and the second pulse signal PS2. The second pulse rise time of the pulse signal PS2 is later than that of the pulse signal PS1, and the fourth pulse rise times of the pulse signal PS2 is earlier than that of the pulse signal PS1. As a result, the first servo sub-frames SSF1 in which some of the arrangement intervals of the inclined portions of the A bursts 6a are different from each other as shown in Parts (A) and (B) of FIG. 13 are formed.

Further, the first pulse signal PS1 and the second pulse signal PS2 are transmitted to the head blocks h0 to h4 at the same timing. As a result, in the respective head blocks h0 to h4, the first servo pattern 601 (first servo band identification information) and the second servo pattern 602 (second servo band identification information) are respectively recorded in the servo bands s0, s1, and s4 and the servo bands s2 and s3 in the same phase.

<Details of Present Technology>

[Regarding Fluctuations in Tape Width]

Incidentally, the magnetic tape 1 is generally produced through application of a magnetic material to a base film (base material 41), calendering, cutting, recording processing of the servo pattern 6, and the like. Since these processes are performed while winding the base film a constant tension, the obtained magnetic tape 1 has internal strain and tends to expand in width over time. Further, the higher the temperature or humidity of the preservation environment of the magnetic tape 1, the wider the tape width. Further, in the magnetic tape 1 wound around the tape reel 13 of the tape cartridge 10, since a higher winding pressure is applied to the inner peripheral side of the tape reel 13 than to the outer peripheral side, the tape width tends to be wider than the outer peripheral side. In particular, in recent magnetic tapes desired to have high capacity, since the total thickness of the tape is reduced due to the reduction in the thickness of the base film and in the thickness of the coating and the number of windings of the magnetic tape around the reel increases, the influence of fluctuations in the width dimension of the magnetic tape further increases.

For this reason, when recording or reproducing data by a tape drive device, even if the magnetic tape is caused to travel with the same tension as that when recording the servo pattern, the width dimension of the magnetic tape is greater than the width dimension of the magnetic tape when recording the servo pattern in some cases. In this case, since the intervals between adjacent servo bands change, the intervals between the servo patterns recorded in these servo bands also fluctuate, and thus, desired tracking control becomes difficult. Such a problem can occur significantly due to the thinning of magnetic tapes accompanying the recent increase in recording capacity.

More specifically, the "ECMA-319 standard" defines the arrangement interval (servo band pitch) of the servo bands s, and the value thereof is 2858.8 μm±4.6 μm. In the tape drive device 30 of the LTO standard, typically, a first pitch P1 (see FIG. 7) that is the arrangement interval of the two servo read heads 132 in the drive head 36 is set to the central value (2858.8 μm) of the standard values of the servo band pitch. The first pitch P1 is the distance between the centers of the two servo read heads 132 in the tape width direction.

Figure 18:
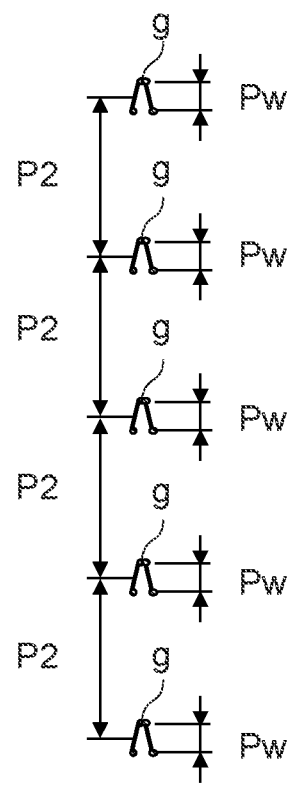
FIG. 18 is a diagram showing arrangement intervals of magnetic gaps provided in the servo write head.

Meanwhile, the servo write head 113 in the servo pattern recording apparatus 100 includes the plurality of magnetic gaps g (see FIG. 15) for recording the servo pattern 6 in the respective servo bands s of the magnetic tape 1. As shown in FIG. 18, the magnetic gaps g are arranged at a second pitch P2 that is a constant interval. The second pitch P2 is the distance between the centers of pattern widths Pw of two adjacent magnetic gaps g in the tape width direction.

Here, in the case where the second pitch P2 has the same value as that of the first pitch P1 (2858.8 µm), the trace position of the servo pattern 6 by the servo read head 132 of the tape drive device 30 is deviated from the central value of the pattern width Pw of the servo pattern 6 in some cases due to fluctuations in the width dimension of the magnetic tape 1. As an example, FIG. 19 shows an experimental result obtained by measuring the servo band pitch of the magnetic tape on which a servo pattern has been recorded using a servo write head having the second pitch P2 whose value is the same as that of the first pitch P1, by using the two servo read heads 132 of the tape drive device 30.

As a measurement method of the servo band pitch, the magnetic tape 1 is caused to travel by the tape drive device 30, the servo trace lines T on the respective servo bands of the two servo read heads 132 are measured, and a servo band pitch is measured on the basis of the relative position of each of the measured servo trace lines T with respect to the servo pattern 6.

Here, in the case here the servo band pitch of the magnetic tape 1 is the same as the first pitch P1, if the servo trace line T of one servo read head 132 is located at the center of the servo pattern 6 on one servo band, the servo trace line T of the other servo read head 132 is also located at the center of the servo pattern 6 on the other servo band. Meanwhile, in the case where the other servo trace line T is deviated from the central position of the other servo pattern 6, the servo band pitch of the magnetic tape 1 has a value different from that of the first pitch P1.

Figure 19:
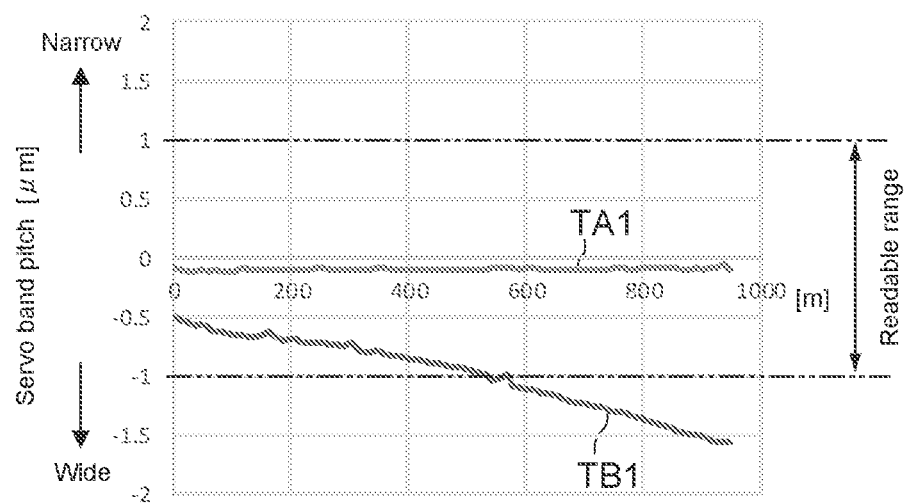
FIG. 19 is a diagram showing an experimental result of a servo band pitch of the magnetic tape measured using the tape drive device.

Here, as shown by the vertical axis of FIG. 19, the difference between the measured values of the respective servo trace lines T is taken, and assumption is made that the servo band pitch is narrowed in the case where the difference is positive and the servo band pitch is widened in the case where the difference is negative.

In FIG. 19, the horizontal axis represents the lengths from the end portion on the outer periphery side of the magnetic tape 1 wound around the tape reel 13 (hereinafter, referred to also as BOT) to the end portion on the inner peripheral side of the magnetic tape 1 wound around the tape reel 13 (hereinafter, referred to as EOT), which is approximately 1000 m here. Further, the vertical axis indicates the servo band pitch obtained from the servo signal that is the reproduction signal of the servo pattern, which is the amount of deviation from the first pitch P1 here. Therefore, "0 µm" that is the center value thereof means that the difference between the respective servo trace lines T is zero and corresponds to the first pitch P1 (the same applied to FIG. 20 and FIG. 21 described below).

Note that the tension during tape travelling was set to 0.55 N during both servo pattern recording and servo pattern reproduction. Further, TA1 in the figure indicates the measured value for the magnetic tape of the tape cartridge immediately after production, and TB1 indicates the measure value for the magnetic tape of the tape cartridge preserved for one week in a constant temperature bath under the conditions of 29±2° C. and 80±5% RH.

As shown in FIG. 19, the magnetic tape TA1 immediately after production had a substantially constant servo band pitch over its entire length, and the value thereof was slightly wider than the center value. This is presumably because the tape width turned to increase due to the relaxation of internal strain of the magnetic tape TA1 although the tape width slightly decreased due to the tension during tape travelling.

Meanwhile, for the magnetic tape TB1 preserved under predetermined conditions, the amount of expansion of the tape width increased, which particularly indicates that the tape width tends to gradually increase from BOT to EOT. This is presumably due to the swelling of the magnetic tape under the high-temperature and high-humidity environments and the effect of the winding pressure of the tape. This result indicates that, in the case where the track width (Wd) of the recording track 5 of the data band d is 2 µm, the recording track cannot be traced in the length region of approximately 500 m or more from EOT in the magnetic tape TB, and stable recording and reproduction accuracy cannot be achieved.

In order to solve such a problem, in this embodiment, the pattern pitch (second pitch P2, see FIG. 18) of the servo write head 113 is formed to be narrower than the first pitch P1 that is the arrangement interval of the two servo read heads 132 in the tape drive device 30. That is, the servo pattern 6 is recorded in the plurality of servo bands s with the second pitch P2 narrower than the first pitch P1 that is the arrangement interval of the two servo read heads 132 in the tape drive device 30 while causing the magnetic tape 1 to travel with a predetermined tension.

Here, the second pitch P2 was formed to be narrower than the first pitch P1 (center value of the servo band pitch) by 0.75 µm (P2=2858.05 µm). Then, when the servo band pitch was measured under the same condition as that described above, the experiment result shown in FIG. 20 was obtained.

Figure 20:
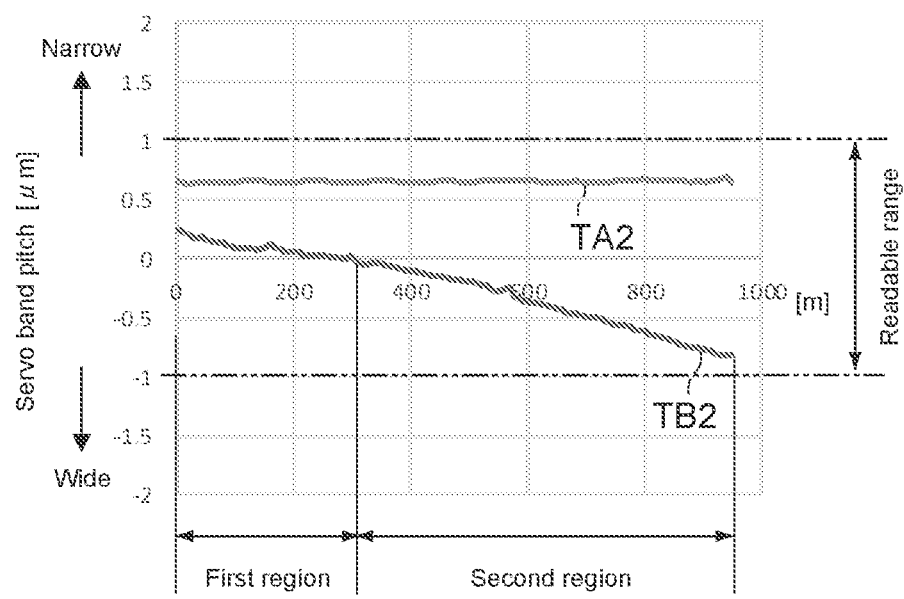
FIG. 20 is a diagram showing another experimental result of the servo band pitch of the magnetic tape measured using the tape drive device.

In FIG. 20, TA2 indicates the measured value for the magnetic tape of the tape cartridge immediately after production, and TB2 indicates the measured value for the magnetic tape of the tape cartridge preserved for one week in a constant temperature bath under the conditions of 29±2° C. and 80±5% RH. In accordance with this embodiment, the servo band pitch can be kept within the readable range of the tape drive device 30 over the entire length of not only the magnetic tape TA2 immediately after production but also the magnetic tape TB2 preserved under predetermined conditions. This enables stable tracking control over the entire tape length, and thus, desired recording and reproduction of data with high accuracy can be realized.

As shown in FIG. 20, in the tape cartridge 10 that includes the magnetic tape 1 produced using the servo pattern recording method according to this embodiment, the magnetic layer 43 of the magnetic tape 1 has a first region having a servo band pitch narrower than the first pitch P1 that is the arrangement interval of the two servo read heads 132 and a second region having a servo band pitch wider than the first pitch P1. The first region is a region on the BOT side and the second region is a region on the EOT side. Then, the servo band pitch of the magnetic layer 43 tends to gradually widen from the BOT side to the EOT side. The tape length located at the boundary between the first region and the second region is favorably, for example, 200 m or more and 400 m or less from BOT, and was approximately 300 m in the example of FIG. 20.

Figure 21:
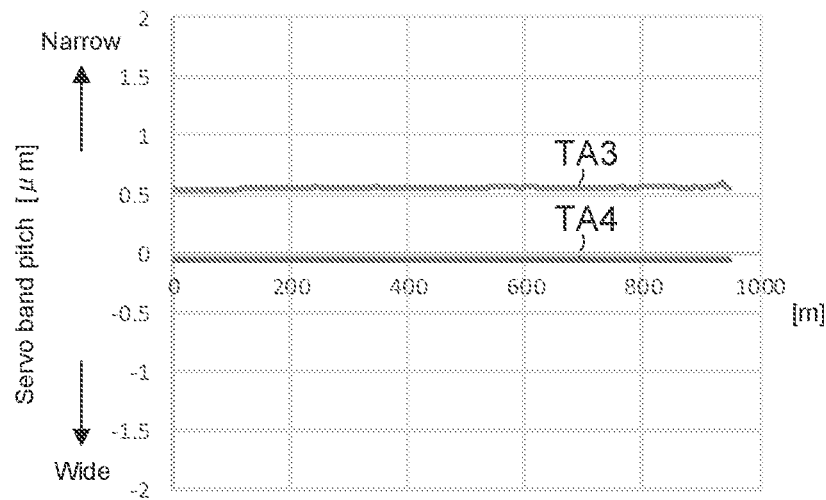
FIG. 21 is a diagram showing still another experimental result of the servo band pitch of the magnetic tape measured using the tape drive device.

Note that the servo band pitch of the magnetic tape 1 measured by the tape drive device 30 can fluctuate also depending on the magnitude of the tension during recording of the servo pattern 6. For example, FIG. 21 shows the experimental result showing the tension effect during recording of a servo pattern. TA3 in FIG. 3 indicates the measured value of the magnetic tape immediately after production when the travelling tension during the servo pattern recording is 0.3 N, and TA4 indicates the measured value of the magnetic tape immediately after production when the travelling tension during the servo pattern recording is 0.6 N. Note that the travelling tension during servo signal recording by the tape drive device 30 was set to 0.55 similarly to the above.

As shown in FIG. 21, the servo band pitch is narrower as the tape tension during servo pattern recording is lower than the tape tension during data recording and reproduction. On the contrary, in the case where the tape tension during servo pattern recording is higher than the tape tension during data recording and reproduction, the servo band pitch changes in the widening direction (see the measurement results of TA2 and TA4). This indicates that the servo band pitch of the magnetic tape 1 measured by the tape drive device 30 can be controlled also by the tape tension in the servo pattern recording apparatus 100.

The tape tension in the servo pattern recording apparatus 100 can be arbitrarily set in accordance with the tape tension in the tape drive device 30, the recording track width Wd of the data band, and the like. For example, in the case where the tape tension in the tape drive device 30 is 0.55 N and the recording track width Wd is 2 µm or less, the tape tension in the servo recording apparatus 100 can be 0.3 N or more and 0.6 N or less. That is, also by adjusting the tape tension during writing of the servo pattern 6 by the servo pattern recording apparatus 100, the servo band pitch can be adjusted.

Further, the value of the pattern pitch (second pitch P2) of the magnetic gap g in the servo write head 113 is not particularly limited as long as it is smaller than the pitch (first pitch P1) of the two servo read heads 132 in the tape drive device 30, and can be arbitrarily adjusted by the type of the magnetic tape 1 (e.g., the thickness of the base material 41) and the like. For example, the difference of the first pitch with respect to the second pitch P2 is 5 µm or less. More favorably, in the case where the first pitch P1 is 2858.8 µm, the second pitch P2 is 2854.2 µm or more and 2858.7 µm or less.

[Measurement Method of Servo Band Pitch]

Subsequently, a measurement method of a servo band pitch will be described.

Measurement Example 1

The magnetic tape 1 is developed using, as a ferricolloid developer, a magnetic colloid solution such as a developer "Sigmarker Q" manufactured by Sigma Hi-Chemical Inc., and the interval between the central positions of the development patterns of the servo patterns 6 recorded in two adjacent servo bands is measured to calculate a servo band pitch.

Measurement Example 2

Figure 22:
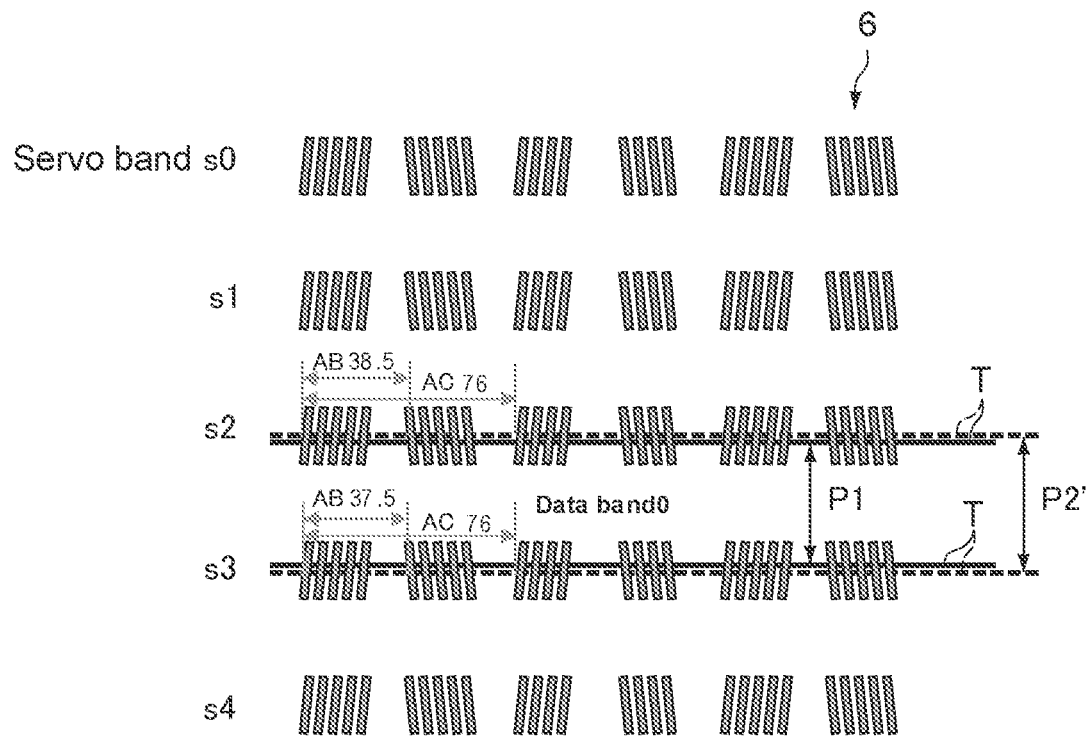
FIG. 22 is a diagram describing a measurement method of a servo band pitch using the tape drive device.

The servo band pitch can be used using the tape drive device 30. Here, as shown in FIG. 22, an example in which the data band d0 sandwiched between the servo band s2 and the servo band s3 is tracked by the drive head 36 will be described.

In the measurement method of the servo band pitch using the tape drive device 30, the magnetic tape 1 is caused to travel by the tape drive device 30, the servo trace lines T on the respective servo bands of the two servo read heads 132 are measured, and a servo band pitch is measured on the basis of the relative position of each of the measured servo trace lines T with respect to the servo pattern 6, as described above. In FIG. 22, the interval between the servo trace lines T indicated by solid lines indicates the servo band pitch (first pitch P1 that is the arrangement interval between the two servo read heads 132 of the drive head 36) when the width of the magnetic tape 1 does not change. Further, in FIG. 22, the interval between the servo trace lines T indicated by broken lines corresponds to a servo band pitch (P2') when the width of the magnetic tape 1 is widened.

Figure 23:
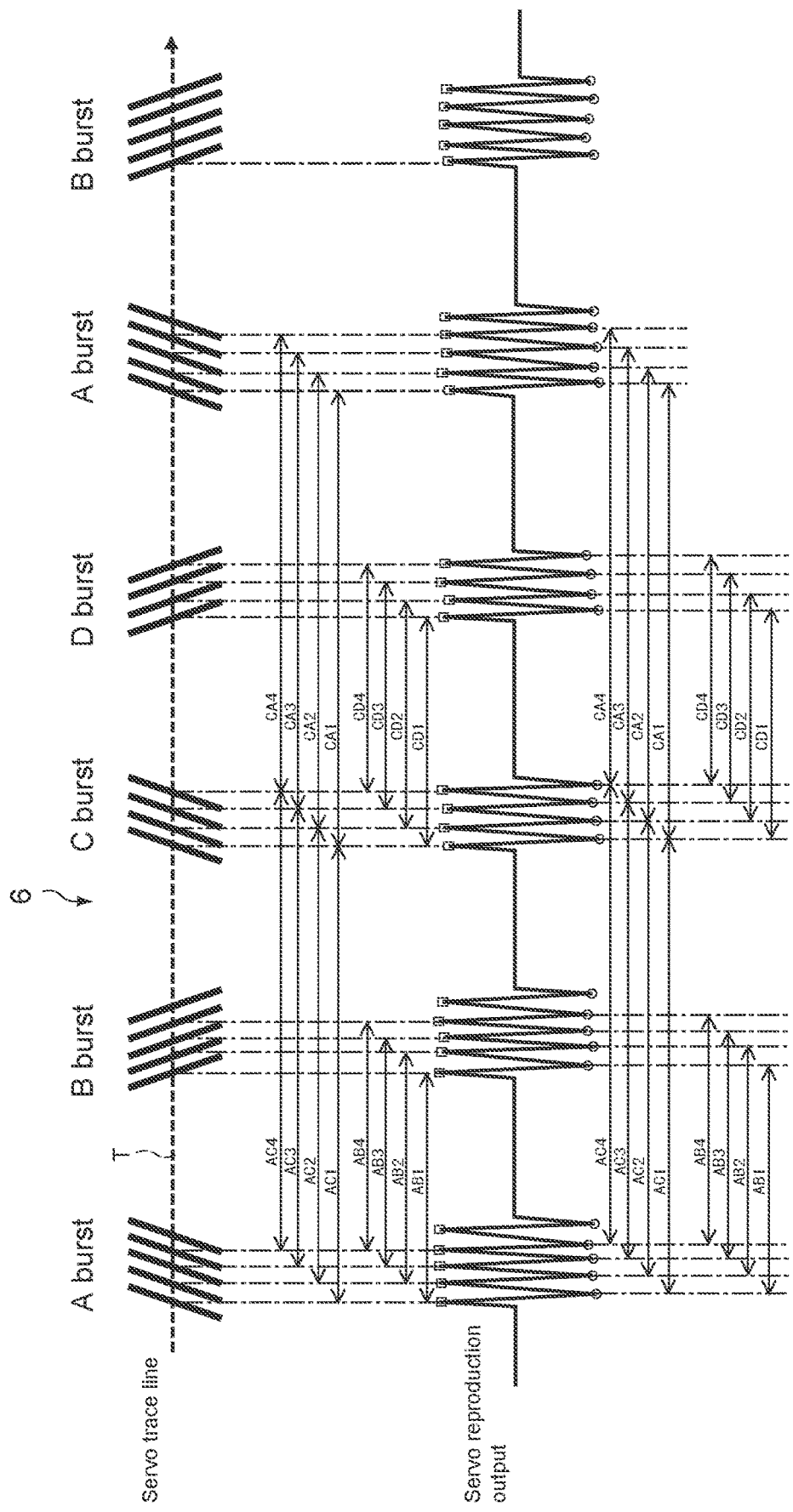
FIG. 23 is an explanatory diagram of a method of measuring a servo trace line.

FIG. 23 is a diagram describing a measurement method of the servo trace line T. The tape drive device outputs a servo reproduction signal of the waveform corresponding to the position of the servo trace line T with respect to the servo pattern 6 (see FIG. 19). Typically, a distance AC between the A burst and the C burst, which are arrays of inclined patterns of the same shape, and a distance AB between the A burst and the B burst, which are arrays of inclined patterns of different shapes, are calculated, and the position of the servo trace line T of each servo read head 132 is measured by the following formula [Math. 1]. Note that θ is an azimuth angle of each inclined pattern corresponding to the angle α in FIG. 5 and is 12° in this example.

$$\frac{\Sigma\ AB\ \text{Time}}{\Sigma\ AC\ \text{Time}} \times AC[\text{um}] \times \frac{1}{2\ \tan\theta} \qquad [\text{Math. 1}]$$

Here, the distance AC may be a distance AC1 between first inclined portions of the A burst and the C burst, a distance AC2 between second inclined portions thereof, a distance AC3 between third inclined portions thereof, or a distance AC4 between fourth inclined portions thereof. These distances AC (AC1 to AC4) refer to the distances between the positions (upper peak positions) each indicating the maximum positive value of the amplitude in the servo reproduction waveform.

Similarly, the distance AB may be a distance AB1 between first inclined portions of the A burst and the B burst, a distance AB2 between second inclined portions thereof, a distance AB3 between third inclined portions thereof, or a distance AB4 between fourth inclined portions thereof. Typically, the distance AB1 is adopted in the case where the distance AC1 is adopted, the distance AB2 is adopted in the case where the distance AC2 is adopted, the distance AB3 is adopted in the case where the distance AC3 is adopted, and the distance AB4 is adopted in the case where the distance AC4 is adopted, Then, the servo band pitch is obtained from the difference between the numerical values representing the positions of the respective servo trace lines T on the servo patterns, which are obtained from the ratio of the distance AB and the distance AC and calculated using the formula [Math. 1]. Here, the difference in the measured value of the servo band (servo band s2), of the two servo bands to be measured, on the tape center side from the measured value of the servo band (servo band s3) on the tape edge side. The positive or negative of the value means the direction of change in the tape width. The positive value corresponds to narrowing of the servo band pitch and the negative value corresponds to widening of the servo band pitch. In the case where the difference described above is zero, it means that there is no fluctuation in tape width.

The servo band pitch is favorably obtained from the difference of many servo frames and may be, for example, the average value of the measured values calculated from the differences of 100 to 100000 servo frames. The tape tension during the measurement is set to 0.55 N, and the measurement is performed with a constant tension over the entire length of the magnetic tape 1.

Note that the measurement method of the servo trace line T is not limited to the example described above. For example, a distance CA between the C burst and the A burst and a distance CD between the C burst and the D burst may be calculated, and the position of the servo trace line T may be measured using the following formula [Math. 2].

$$\frac{\Sigma\ CD\ \text{Time}}{\Sigma\ CA\ \text{Time}} \times CA[\text{um}] \times \frac{1}{2\tan\theta} \quad [\text{Math. 2}]$$

Here, the distance CA may be a distance CA1 between first inclined portions of the C burst and the A burst, a distance CA2 between second inclined portions thereof, a distance CA3 between third inclined portions thereof, or a distance CA4 between fourth inclined portions thereof. These distances CA (CA1 to CA4) refer to the distances between the positions each indicating the maximum positive value of the amplitude in the servo reproduction waveform.

Similarly, the distance CD may be a distance CD1 between first inclined portions of the C burst and the D burst, a distance CD2 between second inclined portions thereof, a distance CD3 between third inclined portions thereof, or a distance CD4 between fourth inclined portions thereof. Typically, the distance CD1 is adopted in the case where the distance CA1 is adopted, the distance CD2 is adopted in the case where the distance CA2 is adopted, the distance CD3 is adopted in the case where the distance CA3 is adopted, and the distance CD4 is adopted in the case where the distance CA4 is adopted.

Further, the average value of the measured value using the formula [Math. 1] and the measured value using the formula [Math. 2] may be used as the measured value of the servo band pitch.

Further, the distances between the positions (lower peak positions) indicating the maximum negative values of the amplitude in the servo reproduction waveform may be adopted as the distances AC and AB in the formula [Math. 1] and the distances CA and CD in the formula [Math. 2].

Alternatively, the average values of the distances between the positions indicating the maximum positive values of the amplitude in the servo reproduction waveform and the distances between the positions indicating the maximum negative values of the amplitude in the servo reproduction waveform may be used as the distances AC and AB in the formula [Math. 1] and the distances CA and CD in the formula [Math. 2].

As shown in FIG. 22, in the case where the servo trace lines T are located at the positions indicated by the broken lines, the distance AB is 38.5 µm and the distance AC is 76 µm in the servo band s2 and the distance AB is 37.5 µm and the distance AC is 76 µm in the servo band s3.

In the servo band s2, (38.5/76)×(76/2 tan 12°)=90.5641 [µm]

In the servo band s3, and (37.5/76)×(76/2 tan 12°)=88.2118 [µm].

The difference between these values is 88.2118−90.5641=−2.3523 [µm].

Therefore, the servo band pitch in this case is obtained as a value wider than the first pitch P1 that is the interval between the servo read heads by 2.3523 µm.

Note that in the case where the servo trace lines T are located at the positions indicated by the solid lines as shown in FIG. 22, the distance AB is 38 µm and the distance AC is 76 µm in both the servo band s2 and the servo band s3. In this case, in both the servo band s2 and the servo band s3, the servo band pitches are 89.3880 [µm] and the difference between them is 0 [µm].

In this embodiment, the servo pattern 6 is recorded on the magnetic tape 1 using the servo write head 113 including the magnetic gaps g arranged at the second pitch P2 narrower than the first pitch P1. The magnetic tape 1 produced in this way at least partially has a region (first region, see FIG. 20) where the servo pattern pitch that is the distance between two adjacent servo bands is narrower than the first pitch P1. Typically, the first region is distributed unevenly in the region on the BOT side as described above.

The difference between the servo pattern pitch in the first region and the first pitch P1 is, for example, 0.1 µm or more and 4.6 µm or less, favorably 0.5 µm or more and 4.6 µm or less. 0.1 µm that is the lower limit value of the difference described above means, for example, 0.1 µm narrower than 2858.8 µm that is the first pitch P1 and the central value of the "ECMA-319 standard". 4.6 µm that is the upper limit value of the difference described above means, for example, 2854.2 µm that is the lower limit value of the "ECMA-319 standard". The lower limit value and the upper limit value of the difference described above are dimensions for correcting the spread of the servo pattern pitch on the tape due to future changes over time. This enables stable tracking control of the drive head 36 over the entire length of the tape and desired recording and reproduction accuracy of data can be provided.

[Details of Magnetic Tape]

Subsequently, details of the magnetic tape 1 will be described.

The magnetic tape 1 has a long tape shape and is caused to travel in the longitudinal direction during recording and reproduction. Note that the surface of the magnetic layer 43 is a surface on which a magnetic head included in a recording/reproduction apparatus (not shown) is caused to travel. The magnetic tape 1 is favorably used in a recording/reproduction apparatus including a ring-type head as a recording head. The magnetic tape 1 is favorably used in a recording/reproduction apparatus configured to be capable of recording data with a data track width of 1500 nm or less or 1000 nm or less.

(Base Material)

As shown in FIG. 2, the base material 41 is a non-magnetic support that supports the underlayer 42 and the magnetic layer 43. The base material 41 has a long film shape. The upper limit value of the average thickness of the base material 41 is favorably 4.2 µm or less, more favorably 4.0 µm or less, still more favorably 3.8 µm or less, and most favorably 3.4 µm or less. When the upper limit value of the average thickness of the base material 41 is 4.2 µm or less, it is possible to make the recording capacity of a single data cartridge larger than that of a general magnetic tape. The lower limit value of the average thickness of the base material 41 is favorably 3 µm or more, and more favorably 3.2 µm or more. When the lower limit value of the average thickness of the base material 41 is 3 μm or more, it is possible to suppress a decrease in the strength of the base material 41.

The average thickness of the base material 41 is obtained as follows. First, the magnetic tape 1 having a width of ½ inch is prepared and cut into a length of 250 mm to prepare a sample. Subsequently, the layers of the sample other than the base material 41 (i.e., the underlayer 42, the magnetic layer 43, and the back layer 44) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 41) at five or more positions, and the measured values are simply averaged (arithmetically averaged) to calculate the average thickness of the base material 41. Note that the measurement positions are randomly selected from the sample.

The base material 41 favorably contains polyester. When the base material 41 contains polyester, the Young's modulus of the base material 41 in the longitudinal direction can be reduced. Therefore, it is possible to keep the width of the magnetic tape 1 constant or substantially constant by adjusting the tension of the magnetic tape 1 in the longitudinal direction during travelling by the recording/reproduction apparatus. The Young's modulus of the base material 41 in the longitudinal direction is, for example, 5 GPa or more and 10 GPa or less, favorably 2.5 GPa or more and 7.8 GPa or less, and more favorably 3.0 GPa or more and 7.0 GPa or less.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxycarboxylate. In the case where the base material 41 contains two or more types of polyesters, the two or more types of polyesters may be mixed, may be copolymerized, or may be stacked. At least one of the terminal or the side chain of the polyester may be modified.

The fact that the base material 41 contains polyester can be confirmed, for example, as follows. First, the magnetic tape 1 is prepared and cut into a length of 250 mm to prepare a sample and then the layers of the sample other than the base material 41 are removed in a way similar to that in the measurement method of the average thickness of the base material 41. Next, the IR spectrum of the sample (base material 41) is acquired using the infrared absorption spectrometry (IR). On the basis of this IR spectrum, the fact that the base material 41 contains polyester can be confirmed.

The base material 41 may further contain, for example, at least one of polyamide, polyetheretherketone, polyimide, polyamideimide, or polyetheretherketone (PEEK) in addition to the polyester, or may further contain at least one of polyamide, polyimide, polyamideimide, polyolefins, a cellulose derivative, a vinyl resin, or another polymer resin. The polyamide may be aromatic polyamide (aramid). The polyimide may be aromatic polyimide. The polyamideimide may be aromatic polyamideimide.

In the case where the base material 41 contains a polymer resin other than polyester, the base material 41 favorably contains polyester as a main component. Here, the main component means the component with the highest content (mass ratio), of the polymer resins contained in the base material 41. In the case where the base material 41 contains a polymer resin other than polyester, the polyester and the polymer resin other than the polyester may be mixed or may be copolymerized.

The base material 41 may be biaxially stretched in the longitudinal direction and the width direction. The polymer resin contained in the base material 41 is favorably oriented in an oblique direction with respect to the width direction of the base material 41.

(Magnetic Layer)

The magnetic layer 43 is a recording layer for recording a signal with a magnetization pattern. The magnetic layer 43 may be a recording layer of a perpendicular recording type or may be a recording layer of a longitudinal recording type. The magnetic layer 43 contains, for example, magnetic powder, a binder, and a lubricant. The magnetic layer 43 may further contain at least one additive of an antistatic agent, an abrasive, a curing agent, a rust inhibitor, a non-magnetic reinforcing particle, or the like, as necessary. The magnetic layer 43 does not necessarily need to include a coating film of a magnetic material and may include a sputtering film or a deposition film of a magnetic film.

An arithmetic average roughness Ra of the surface of the magnetic layer 43 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved. The lower limit value of the arithmetic average roughness Ra of the surface of the magnetic layer 43 is favorably 1.0 nm or more, and more favorably 1.2 nm or more. When the lower limit value of the arithmetic average roughness Ra of the surface of the magnetic layer 43 is 1.0 nm or more, it is possible to suppress deterioration of the traveling property due to an increase in friction.

The arithmetic average roughness Ra can be obtained as follows. First, the surface of the magnetic layer 43 is observed by an atomic force microscope (AFM) to obtain an AFM image of 40 μm×40 μm. Nano Scope IIIa D3100 manufactured by Digital Instruments is used as the AFM, one formed of silicon single crystal is used as a cantilever (Note 1), and measurement is performed by turning at 200 to 400 Hz as the tapping frequency. Next, the AFM image is divided into 512×512 (=262,144) measurement points, a height Z(i) (i: measurement point numbers, i=1 to 262,144) is measured at each measurement point, and the heights Z(i) at the respective measurement points are simply averaged (arithmetically averaged) to obtain an average height (average surface) Zave (=(Z(1)+Z(2)+ . . . +Z(262,144))/262,144). Subsequently, a deviation Z"(i) from an average center line at each measurement point (=Z(i)−Zave) is obtained to calculate the arithmetic average roughness Ra [nm] (=(Z"(1)+Z"(2)+ . . . +Z"(262,144))/262,144). At this time, one that has been subjected to filtering by second-order Flatten and third-order planefit in XY as image processing is used as data.

(Note 1) SPM probe NCH of a normal type, POINT-PROBE manufactured by NanoWorld

L (cantilever length)=125 μm

The upper limit value of an average thickness $t_m$ of the magnetic layer 43 is 80 nm or less, favorably 70 nm or less, and more favorably 50 nm or less. When the upper limit value of the average thickness $t_m$ of the magnetic layer 43 is 80 nm or less, the influence of the demagnetizing field can be reduced in the case where a ring-type head is used as the recording head, and thus, more excellent electromagnetic conversion characteristics can be achieved.

The lower limit value of the average thickness $t_m$ of the magnetic layer 43 is favorably 35 nm or more. When the lower limit value of the average thickness $t_m$ of the magnetic layer 43 is 35 nm or more, the output can be ensured in the case where an MR-type head is used as the reproduction head, and thus, more excellent electromagnetic conversion characteristics can be achieved.

The average thickness $t_m$ of the magnetic layer 43 is obtained as follows. First, the magnetic tape 1 housed in the cartridge 10 is unwound, and the magnetic tape 1 is cut at three positions of 10 m, 30 m, and 50 m from one end thereof on the outermost periphery side to prepare three samples. Subsequently, each sample (the magnetic tape 1 to be measured) is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

The cross section described above of the obtained sliced sample is observed through a transmission electron microscope (TEM) under the following conditions to obtain a TEM image of each sliced sample. Note that the magnification and the acceleration voltage may be adjusted as appropriate in accordance with the type of apparatus.

Apparatus: TEM (H9000NAR manufactured by Hitachi, Ltd.)
  Acceleration voltage: 300 kV
  Magnification: 100,000 times Next, the thickness of the magnetic layer 43 is measured at at least ten or more positions of each sliced sample using the obtained TEM image of each sliced sample. Note that since the slicing is performed along the longitudinal direction of the magnetic tape 1 as described above, the 10 measurement positions of each sliced sample are randomly selected from the test piece such that they are different positions in the longitudinal direction of the magnetic tape 1. The average value obtained by simply averaging (arithmetically averaging) the obtained measured values of each sliced sample (thickness of the magnetic layer 43 at a total of 30 points) is used as the average thickness $t_m$ [nm] of the magnetic layer 43.

(Magnetic Powder)

The magnetic powder includes a plurality of magnetic particles. The magnetic particles are, for example, particles including hexagonal ferrite (hereinafter, referred to as "hexagonal ferrite particles"), particles including epsilon-iron oxide (ε-iron oxide) (hereinafter, referred to as "ε-iron oxide particles"), or particles including Co-containing spinel ferrite (hereinafter, referred to as "cobalt ferrite particles"). The magnetic powder is favorably crystal-oriented preferentially in the thickness direction of the magnetic tape 1 (perpendicular direction).

(Hexagonal Ferrite Particles)

Each of the hexagonal ferrite particles has a plate shape such as a hexagonal plate shape or a columnar shape such as a hexagonal columnar shape (where the thickness or height is smaller than the major axis of the plate surface or bottom surface). In this specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula of $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes powder of the hexagonal ferrite particles, the average particle size of the magnetic powder is favorably 13 nm or more and 22 nm or less, more favorably 13 nm or more and 19 nm or less, still more favorably 13 nm or more and 18 nm or less, particularly favorably 14 nm or more and 17 nm or less, and most favorably 14 nm or more and 16 nm or less. When the average particle size of the magnetic powder is 22 nm or less, more excellent electromagnetic conversion characteristics (e.g., SNR) can be achieved in the magnetic tape 1 having high recording density. Meanwhile, when the average particle size of the magnetic powder is 13 nm or more, the dispersibility of the magnetic powder is further improved and further excellent electromagnetic conversion characteristics (e.g., SNR) can be achieved.

In the case where the magnetic powder includes powder of the hexagonal ferrite particles, the average aspect ratio of the magnetic powder is favorably 1.0 or more and 3.0 or less, more favorably 1.5 or more and 2.8 or less, and still more favorably 1.8 or more and 2.7 or less. When the average aspect ratio of the magnetic powder is within a range of 1.0 or more and 3.0 or less, agglomeration of the magnetic powder can be suppressed. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the hexagonal ferrite particles, the average particle size and the average aspect ratio of the magnetic powder are obtained as follows. First, the magnetic tape 1 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. The number of TEM photographs to be prepared is the number that 50 particles for which a plate diameter DB and a plate thickness DA (see FIG. 24) shown below can be measured can be extracted.

Figure 24:
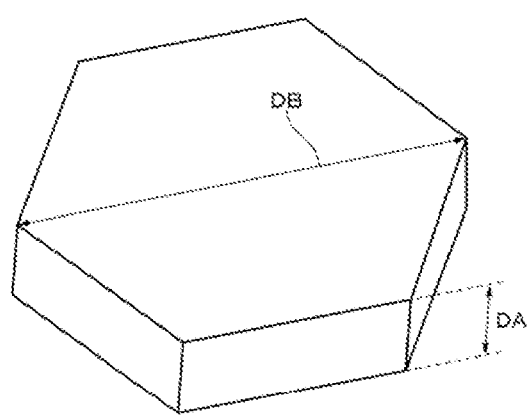
FIG. 24 is an explanatory diagram of a particle shape of hexagonal ferrite that is magnetic powder.

In this specification, regarding the size of the hexagonal ferrite particles (hereinafter, referred to as a "particle size"), in the case where the shape of the particle observed in the TEM photograph described above is a plate shape or a columnar shape (where the thickness or height is smaller than the major axis of the plate surface or bottom surface.) as shown in FIG. 24, the major axis of the plate surface or bottom surface is used as the value of the plate diameter DB. The thickness or height of the particle observed in the TEM photograph described above is used as the value of the plate thickness DA. In the case where the plate surface or bottom surface of the particle observed in the TEM photograph has a hexagonal shape, the major axis means the longest diagonal distance. In the case where the thickness of height or the particle is not constant in one particle, the maximum thickness or height of the particle is used as the plate thickness DA.

Next, 50 particles to be extracted from the taken TEM photograph are selected on the basis of the following criteria. Particles partially protruding outside the field of view of the TEM photograph are not measured, and particles with clear contours and present in isolation are measured. In the case where particles overlap, each of particles is measured as a single particle if the boundary between the particles is clear and the shape of the entire particle can be determined. However, particles whose boundaries are unclear and whose overall shape cannot be determined are not measured because the shape of the particle cannot be determined.

The plate thickness DA of each of the selected 50 particles is measured. The plate thicknesses DA obtained in this way are simply averaged (arithmetically averaged) to obtain an average plate thickness $DA_{ave}$. The average plate thickness $DA_{ave}$ is the average particle plate thickness. Subsequently, a plate diameter DB of each magnetic powder is measured. In order to measure the plate diameter DB of the particle, 50 particles whose plate diameter DB can be clearly checked are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter DB ave is the average particle size. Then, an average aspect ratio ($DB_{ave}/DA_{ave}$) of the particles is obtained on the basis of the average plate thickness $DA_{ave}$ and the average plate diameter $DB_{ave}$.

In the case where the magnetic powder includes powder of the hexagonal ferrite particles, the average particle volume of the magnetic powder is favorably 500 nm³ or more and 2500 nm³ or less, more favorably 500 nm³ or more and 1600 nm³ or less, still more favorably 500 nm³ or more and 1500 nm³ or less, particularly favorably 600 nm³ or more and 1200 nm³ or less, and most favorably 600 nm³ or more and 1000 nm³ or less. When the average particle volume of the magnetic powder is 2500 nm³ or less, an effect similar to that in the case where the average particle size of the magnetic powder is 22 nm or less can be achieved. Meanwhile, when the average particle volume of the magnetic powder is 500 nm³ or more, an effect similar to that in the case where the average particle size of the magnetic powder is 13 nm or more can be achieved.

The average particle volume of the magnetic powder is obtained as follows. First, as described above with respect to the method of calculating the average particle size of the magnetic powder, the average major axis length DA ave and the average plate diameter $DB_{ave}$ ave are obtained. Next, an average volume V of the magnetic powder is obtained in accordance with the following formula.

$$V = \frac{3\sqrt{3}}{8} \times DA_{ave} \times DB_{ave} \times DB_{ave} \qquad \text{[Math. 3]}$$

(ε-Iron Oxide Particles)

The ε-iron oxide particles are hard magnetic particles capable of achieving a high coercive force even as minute particles. The ε-iron oxide particles each have a spherical shape or a cubic shape. In this specification, the spherical shape includes a substantially spherical shape. Further, the cubic shape includes a substantially cubic shape. Since the ε-iron oxide particles have the shape as described above, it is possible to reduce the contact area of the particles in the thickness direction of the magnetic tape 1 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a core-shell structure. Specifically, the ε-iron oxide particle includes a core portion and a shell portion having a two-layer structure provided around the core portion. The shell portion having the two-layer structure includes a first shell portion provided on the core portion and a second shell portion provided on the first shell portion.

The core portion contains ε-iron oxide. The ε-iron oxide contained in the core portion is favorably one having $\varepsilon\text{-}Fe_2O_3$ crystals as the main phase, and more favorably one formed of single-phase $\varepsilon\text{-}Fe_2O_3$.

The first shell portion covers at least part of the periphery of the core portion. Specifically, the first shell portion may partially cover the periphery of the core portion or may entirely cover the periphery of the core portion. It is favorable that the first shell portion covers the entire surface of the core portion from the viewpoint of making the exchange coupling between the core portion and the first shell portion sufficient and improving the magnetic properties.

The first shell portion is a so-called soft magnetic layer and includes a soft magnetic material such as α-Fe, a Ni—Fe alloy, and an Fe—Si—Al alloy. The α-Fe may be obtained by reducing the ε-iron oxide contained in the core portion.

The second shell portion is an oxide film as an antioxidant layer. The second shell portion contains α-iron oxide, aluminum oxide, or silicon oxide. The α-iron oxide contains, for example, at least one iron oxide of $Fe_3O_4$, $Fe_2O_3$, or FeO. In the case where the first shell portion contains α-Fe (soft magnetic material), the α-iron oxide may be obtained by oxidizing α-Fe contained in the first shell portion.

Since the ε-iron oxide particle includes the first shell portion as described above, it is possible to adjust a coercive force Hc of the entire ε-iron oxide particles (core-shell particles) to the coercive force Hc suitable for recording while maintaining the coercive force Hc of the core portion alone at a large value for achieving thermal stability. Further, since the ε-iron oxide particle includes the second shell portion as described above, it is possible to suppress deterioration of the properties of the ε-iron oxide particles due to the ε-iron oxide particles being exposed to the air and the surfaces of the particles being rusted in the process of producing the magnetic tape 1 and before the process. Therefore, it is possible to suppress deterioration of the properties of the magnetic tape 1.

The ε-iron oxide particle may include a shell portion having a single-layer structure. In this case, the shell portion has a configuration similar to that of the first shell portion. However, from the viewpoint of suppressing deterioration of the properties of the ε-iron oxide particles, it is favorable that the ε-iron oxide particle includes the shell portion having a two-layer structure, as described above.

The ε-iron oxide particles may include an additive instead of the core-shell structure described above or may include an additive while having the core-shell structure. In this case, some Fes of the ε-iron oxide particles are substituted by the additive. Also with the ε-iron oxide particles including the additive, the coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and sill more favorably at least one of Al or Ga.

Specifically, the ε-iron oxide including the additive is ε-$Fe_{2-x}M_xO_3$ crystals (where M is a metal element other than iron, favorably a trivalent metal element, more favorably at least one of Al, Ga, or In, and still more favorably at least one of Al or Ga. x is, for example, 0<x<1).

In the case where the magnetic powder includes the ε-iron oxide particles, the average particle size of the magnetic powder is favorably 10 nm or more and 20 nm or less, more favorably 10 nm or more and 18 nm or less, still more favorably 10 nm or more and 16 nm or less, particularly favorably 10 nm or more and 15 nm or less, and most favorably 10 nm or more and 14 nm or less. In the magnetic tape 1, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, when the average particle size of the magnetic powder is 20 nm or less, it is possible to achieve more excellent electromagnetic conversion characteristics (e.g., SNR) in the magnetic tape 1 having high recording density (e.g., the magnetic tape 1 configured to be capable of recording a signal at the shortest recording wavelength of 40 nm or less). Meanwhile, when the average particle size of the magnetic powder is 10 nm or more, the dispersibility of the magnetic powder is further improved and it is possible to achieve more excellent electromagnetic conversion characteristics (e.g., SNR).

In the case where the magnetic powder includes the ε-iron oxide particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the ε-iron oxide particles, the average particle size and the average aspect ratio of the magnetic powder are obtained as follows. First, the magnetic tape 1 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 1 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. Next, 50 particles, which have the shape that can be clearly checked, are selected from the taken TEM photograph, and a long-axis length DL and a short-axis length DS of each particle are measured. Here, the long-axis length DL means the maximum one (so-called maximum Feret diameter) of distances between two parallel lines drawn at any angle so as to be in contact with the outline of each particle. Meanwhile, the short-axis length DS means the maximum one of particle lengths in a direction orthogonal to a long axis (DL) of the particle. Subsequently, the measured long-axis lengths DL of the 50 particles are simply averaged (arithmetically averaged) to obtain an average major axis length $DL_{ave}$. The average major axis length DL ave obtained in this way is used as the average particle size of the magnetic powder. Further, the measured short-axis lengths DS of the 50 particles are simply averaged (arithmetically averaged) to obtain an average short-axis length $DS_{ave}$. Then, an average aspect ratio ($DL_{ave}/DS_{ave}$) of the particles is obtained on the basis of the average major axis length DL ave and the average short-axis length $DS_{ave}$.

In the case where the magnetic powder includes the ε-iron oxide particles, the average particle volume of the magnetic powder is favorably 500 $nm^3$ or more and 4000 $nm^3$ or less, more favorably 500 $nm^3$ or more and 3000 $nm^3$ or less, still more favorably 500 $nm^3$ or more and 2000 $nm^3$ or less, particularly favorably 600 $nm^3$ or more and 1600 $nm^3$ or less, and most favorably 600 $nm^3$ or more and 1300 $nm^3$ or less. Since noise of the magnetic tape 1 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 4000 $nm^3$ or less, it is possible to achieve more excellent electromagnetic conversion characteristics (e.g., SNR) as in the case where the average particle size of the magnetic powder is 20 nm or less. Meanwhile, when the particle volume of the magnetic powder is 500 $nm^3$ or more, an effect similar to that in the case where the average particle size of the magnetic powder is 10 nm or more can be achieved.

In the case where the ε-iron oxide particles each have a spherical shape, the average particle volume of the magnetic powder is obtained as follows. First, the average major axis length DL ave is obtained in a way similar to the method of calculating the average particle size of the magnetic powder described above. Next, the average volume V of the magnetic powder is obtained in accordance with the following formula.

$$V=(\pi/6) \times DL_{ave}^3$$

In the case where the ε-iron oxide particles each have a cubic shape, the average volume of the magnetic powder can be obtained as follows. The magnetic tape 1 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 1 on the side of the magnetic layer 43 and on the side of the back layer 44 by a vapor deposition method and the tungsten thin film is further formed on the surface on the side of the magnetic layer 43 by a vapor deposition method or a sputtering method. The slicing is performed along a length direction (longitudinal direction) of the magnetic tape 1. That is, the slicing forms a cross section parallel to both the longitudinal direction and the thickness direction of the magnetic tape 1.

A transmission electron microscope (H-9500 manufactured by Hitachi High-Technologies Corporation) is used for observing the cross section of the obtained slice sample such that the entire magnetic layer 43 is included with respect to the thickness direction of the magnetic layer 43 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$. Next, an average volume $V_{ave}$ (particle volume) of the magnetic powder is obtained on the basis of the following formula by using the average side length $DC_{ave}$.

$$V_{ave}=DC_{ave}^3$$

(Cobalt Ferrite Particles)

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 1. The cobalt ferrite particle has, for example, a cubic shape. In this specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

(where M is, for example, at least one metal of Ni, Mn, Al, Cu, or Zn. x is a value in a range of 0.4≤x≤1.0. y is a value in a range of 0≤y≤0.3. However, x and y satisfy the relationship of (x+y)≤1.0. z is a value in a range of 3≤z≤4. Some Fes may be substituted by another metal element.)

In the case where the magnetic powder includes powder of the cobalt ferrite particles, the average particle size of the magnetic powder is favorably 8 nm or more and 16 nm or less, more favorably 8 nm or more and 13 nm or less, and still more favorably 8 nm or more and 10 nm or less. When the average particle size of the magnetic powder is 16 nm or less, it is possible to achieve more excellent electromagnetic conversion characteristics (e.g., SNR) in the magnetic tape 1 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes powder of the ε-iron oxide particles.

In the case where the magnetic powder includes powder of the cobalt ferrite particles, the average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes powder of the ε-iron oxide particles.

In the case where the magnetic powder includes powder of the cobalt ferrite particles, the average particle volume of the magnetic powder is favorably 500 nm³ or more and 4000 nm³ or less, more favorably 600 nm³ or more and 2000 nm³ or less, and still more favorably 600 nm³ or more and 1000 nm³ or less. When the average particle volume of the magnetic powder is 4000 nm³ or less, an effect similar that in the case where the average particle size of the magnetic powder is 16 nm or less can be achieved. Meanwhile, when the average particle volume of the magnetic powder is 500 nm³ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, —$SO_3M$, —$OSO_3M$, —COOM, P=O $(OM)_2$ (where M represents a hydrogen atom or an alkali metal such as lithium, potassium, and sodium), a side chain amine having a terminal group represented by —NR1R2, —NR1R2R3$^+$X$^-$, a main chain amine represented by >NR1R2$^+$X$^-$ (where R1, R2, and R3 each represent a hydrogen atom or a hydrocarbon group, and X$^-$ represents a halogen element ion such as fluorine, chlorine, bromine, and iodine, an inorganic ion, or an organic ion), and a polar functional group such as —OH, —SH, —CN, and an epoxy group may be introduced into all the binders described above. The amount of the polar functional groups introduced into the binders is favorably $10^{-1}$ to $10^{-8}$ mol/g, and more favorably $10^{-2}$ to $10^{-6}$ mol/g.

(Lubricant)

The lubricant contains, for example, at least one of a fatty acid or a fatty acid ester, and favorably both a fatty acid and a fatty acid ester. Containing a lubricant in the magnetic layer 43, particularly, containing both a fatty acid and a fatty acid ester in the magnetic layer 43, contributes to improving the travelling stability of the magnetic tape 1. More particularly, when the magnetic layer 43 contains a lubricant and has a pore, favorable travelling stability can be achieved. It is conceivable that the improvement in the travelling stability can be achieved because the dynamic friction coefficient of the surface of the magnetic tape 1 on the side of the magnetic layer 43 is adjusted to the value suitable for travelling of the magnetic tape 1 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 1.

$$CH_3(CH_2)_kCOOH \quad (1)$$

(However, in the general formula (1), k is an integer selected from a range of 14 or more and 22 or less, and more favorably a range of 14 or more and 18 or less.)

$$CH_3(CH_2)_nCH=CH(CH_2)_mCOOH \quad (2)$$

(However, in the general formula (2), the sum of n and m is an integer selected from a range of 12 or more and or less, and more favorably a range of 14 or more and 18 or less.)

$$CH_3(CH_2)_pCOO(CH_2) \quad (3)$$

(However, in the general formula (3), p is an integer selected from a range of 14 or more and 22 or less, and more favorably a range of 14 or more and 18 or less, and q is an integer selected from a range of 2 or more and 5 or less, and more favorably a range of 2 or more and 4 or less.)

$$CH_3(CH_2)_rCOO—(CH_2)_sCH(CH_3)_2 \quad (4)$$

(However, in the general formula (4), r is an integer selected from a range of 14 or more and 22 or less, and s is an integer selected from a range of 1 or more and 3 or less.)

(Antistatic Agent)

Examples of the antistatic agent include carbon black, natural surfactant, nonionic surfactant, and cationic surfactant.

(Abrasive)

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

(Curing Agent)

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 42 is for reducing the recesses and projections on the surface of the base material 41 and adjusting the recesses and projections on the surface of the magnetic layer 43. The underlayer 42 is a non-magnetic layer containing a non-magnetic powder, a binder, and a lubricant. The underlayer 42 supplies the lubricant to the surface of the magnetic layer 43. The underlayer 42 may further contain at least one additive of an antistatic agent, a curing agent, a rust inhibitor, or the like as necessary.

An average thickness $t_2$ of the underlayer 42 is favorably 0.3 μm or more and 1.2 μm or less, more favorably 0.3 μm or more and 0.9 μm or less, and 0.3 μm or more and 0.6 μm or less. Note that the average thickness $t_2$ of the underlayer 42 is obtained in a way similar to that for the average thickness $t_1$ of the magnetic layer 43. However, the magnification of the TEM image is adjusted as appropriate in accordance with the thickness of the underlayer 42. When the average thickness $t_2$ of the underlayer 42 is 1.2 μm or less, the stretchability of the magnetic tape 1 due to external force further increases, and thus, adjustment of the width of the magnetic tape 1 by tension adjustment becomes easier.

(Non-Magnetic Powder)

The non-magnetic powder includes, for example, at least one of inorganic particle powder or organic particle powder. Further, the non-magnetic powder may include carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder and Lubricant)

The binder and the lubricant are similar to those of the magnetic layer 43 described above.

(Additive)

The antistatic agent, the curing agent, and the rust inhibitor are similar to those of the magnetic layer 43 described above.

(Back Layer)

The back layer 44 contains a binder and non-magnetic powder. The back layer 44 may further contain at least one additive of a lubricant, a curing agent, an antistatic agent, or the like as necessary. The binder and the non-magnetic powder are similar to those of the underlayer 42 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include non-magnetic powder having two or more granularity distributions.

The upper limit value of the average thickness of the back layer 44 is favorably 0.6 µm or less. When the upper limit value of the average thickness of the back layer 44 is 0.6 µm or less, the underlayer 42 and the base material 41 can be kept thick even in the case where the average thickness of the magnetic tape 1 is 5.6 µm or less, and thus, it is possible to maintain the travelling stability of the magnetic tape 1 in the recording/reproduction apparatus. The lower limit value of the average thickness of the back layer 44 is not particularly limited, but is, for example, 0.2 µm or more.

An average thickness t b of the back layer 44 is obtained as follows. First, an average thickness $t_T$ of the magnetic tape 1 is measured. The measurement method of the average thickness $t_T$ is as described in the following "Average thickness of magnetic tape". Subsequently, the back layer 44 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [µm]. After that, the average thickness $t_b$ [µm] of the back layer 44 is obtained in accordance with the following formula. Note that the measurement positions are randomly selected from the sample.

$$t_b \text{ [µm]} = t_T \text{ [µm]} - t_B \text{ [µm]}$$

The back layer 44 has a surface provided with numerous protruding portions. The numerous protruding portions are for forming numerous hole portions in the surface of the magnetic layer 43 under a state in which the magnetic tape 1 has been wound in a roll shape. The numerous hole portions are formed by numerous non-magnetic particles protruding from the surface of the back layer 44, for example.

(Average Thickness of Magnetic Tape)

The upper limit value of the average thickness (average total thickness) $t_T$ of the magnetic tape 1 is 5.6 µm or less, favorably 5.0 µm or less, more favorably 4.6 µm or less, and still more favorably 4.4 µm or less. When the average thickness $t_T$ of the magnetic tape 1 is 5.6 µm or less, it is possible to make the recording capacity of a single data cartridge larger than that of a general magnetic tape. The lower limit value of the average thickness $t_T$ of the magnetic tape 1 is not particularly limited, but is, for example, 3.5 µm or more.

The average thickness $t_T$ of the magnetic tape 1 is obtained as follows. First, the magnetic tape 1 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [µm]. Note that the measurement positions are randomly selected from the sample.

(Coercive Force Hc)

The upper limit value of a coercive force Hc2 of the magnetic layer 43 in the longitudinal direction of the magnetic tape 1 is favorably 2000 Oe or less, more favorably 1900 Oe or less, and still more favorably 1800 Oe or less. When the coercive force Hc2 of the magnetic layer 43 in the longitudinal direction is 2000 Oe or less, sufficient electromagnetic conversion characteristics can be provided even with high recording density.

The lower limit value of the coercive force Hc2 of the magnetic layer 43 measured in the longitudinal direction of the magnetic tape 1 is favorably 1000 Oe or more. When the coercive force Hc2 of the magnetic layer 43 measured in the longitudinal direction is 1000 Oe or more, it is possible to suppress demagnetization due to leakage flux from the recording head.

The coercive force Hc2 described above is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, a vibrating sample magnetometer (VSM) is used to measure the M-H loop of the measurement sample (the entire magnetic tape 1) corresponding to the longitudinal direction (travelling direction) of the magnetic tape 1. Next, acetone, ethanol, or the like is used to wipe off the coating film (the underlayer 42, the magnetic layer 43, the back layer 44, and the like) of the magnetic tape 1 cut as described above, leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C.±2° C. and 50% RH±5% RH. Further, the "demagnetizing field correction" in measuring the M-H loop in the longitudinal direction of the magnetic tape 1 is not performed.

(Squareness Ratio)

A squareness ratio S1 of the magnetic layer 43 in the perpendicular direction (thickness direction) of the magnetic tape 1 is favorably 65% or more, more favorably 70% or more, still more favorably 75% or more, particularly favorably 80% or more, and most favorably 85% or more. When the squareness ratio S1 is 65% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, the magnetic tape 1 housed in the cartridge is unwound, the magnetic tape 1 is cut at the position of 30 m from one end thereof on the outermost periphery side, and three magnetic tapes 1 are superimposed with double sided tape such that the orientations of the magnetic tapes 1 in the longitudinal direction are the same, and then punched out with a punch of φ6.39 mm to prepare a measurement sample. At this time, marking is performed with arbitrary non-magnetic ink such that the longitudinal direction (travelling direction) of the magnetic tape 1 can be recognized. Then, the M-H loop of the measurement sample (the entire magnetic tape 1) corresponding to the longitudinal direction (travelling direction) of the magnetic tape 1 is measured using a vibrating sample magnetometer (VSM). Next, acetone, ethanol, or the like is used to wipe off the coating film (the underlayer 42, the magnetic layer 43, the back layer 44, and the like) of the magnetic tape 1 cut as described above, leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 1) is measured using the VSM.

In the measurement of the M-H loop of the measurement sample (the entire magnetic tape 1) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 1) and the M-H loop of the correction sample (base material 41) are obtained, the M-H loop of the correction sample (base material 41) is subtracted from the M-H loop of the measurement sample (the entire magnetic tape 1) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1(%). Note that the measurement of the M-H loop described above is performed at 25° C.±2° C. and 50% RH±5% RH. Further, the "demagnetizing field correction" in measuring the M-H loop in the perpendicular direction of the magnetic tape 1 is not performed. Note that the measurement/analysis program attached to the "VSM-P7-15" is used for this calculation.

$$\text{Squareness ratio } S1(\%) = (Mr/Ms) \times 100$$

A squareness ratio S2 of the magnetic layer 43 in the longitudinal direction (travelling direction) of the magnetic tape 1 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio S2 in the longitudinal direction is obtained in a way similar to that for the squareness ratio S1 except for measuring the M-H loop in the longitudinal direction (travelling direction) of the magnetic tape 1 and the base material 41.

(Surface Roughness $R_b$ of Back Surface)

A surface roughness $R_b$ of the back surface (surface roughness of the back layer 44) is favorably $R_b \leq 6.0$ [nm]. When the surface roughness R b of the back surface is within the range described above, it is possible to achieve more excellent electromagnetic conversion characteristics.

MODIFIED EXAMPLE

Although the azimuthal slope (azimuth angle) of the servo frame SF forming the servo pattern 6 has been 12° in the embodiment described above, the present technology is not limited thereto, and the azimuthal slope can be, for example, 11° or more and 36° or less, and favorably 11° or more and 26° or less. Further, although the azimuthal slopes have been of two types, "/" and "Y", an azimuthal slope with an inclination angle different therefrom may further be included in the servo pattern.

Further, although the magnetic tape conforming to the LTO standard has been exemplified as a tape-like magnetic recording medium in the embodiment described above, the present technology can also be applied to a magnetic tape of another standard, similarly.

It should be noted that the present technology may also take the following configurations.

(1) A servo pattern recording method of recording a servo pattern in a plurality of servo bands arrayed at intervals in a width direction of a magnetic layer of a magnetic tape, including:
  causing the magnetic tape to travel with a predetermined tension; and
  recording a servo pattern in the plurality of servo bands at a second pitch narrower than a first pitch that is an arrangement interval of two servo read heads in a tape drive device that records data in the magnetic layer or reproduces data recorded in the magnetic layer.
(2) The servo pattern recording method according to (1) above, in which
  a difference of the second pitch from the first pitch is 5 µm or less.
(3) The servo pattern recording method according to (2) above, in which
  the second pitch is 2854.2 µm or more and 2858.7 µm or less.
(4) The servo pattern recording method according to any one of (1) to (3) above, in which
  the predetermined tension is 0.3 N or more and 0.6 N or less.
(5) A servo pattern recording apparatus that records a servo pattern in a plurality of servo bands arrayed at intervals in a width direction of a magnetic layer of a magnetic tape, including:
  a servo write head that includes a plurality of recording units arranged corresponding to the plurality of servo bands,
  each of the plurality of recording units including a magnetic gap for recording a servo pattern in the plurality of servo bands at a second pitch narrower than a first pitch that is an arrangement interval of two servo read heads in a tape drive device that records data in the magnetic layer or reproduces data recorded in the magnetic layer.
(6) The servo pattern recording apparatus according to (5) above, in which
  a difference of the second pitch from the first pitch is 5 µm or less.
(7) The servo pattern recording apparatus according to (6) above, in which
  the second pitch is 2854.2 µm or more and 2858.7 µm or less.
(8) A method of producing a magnetic tape that includes a magnetic layer including a plurality of servo bands arrayed at intervals in a width direction, including:
  causing the magnetic tape to travel with a predetermined tension; and
  recording a servo pattern in the plurality of servo bands at a second pitch narrower than a first pitch that is an arrangement interval of two servo read heads in a tape drive device that records data in the magnetic layer or reproduces data recorded in the magnetic layer.
(9) The method of producing a magnetic tape according to (8) above, in which
  a difference of the second pitch from the first pitch is 5 µm or less.
(10) The method of producing a magnetic tape according to (8) or (9) above, in which
  the second pitch is 2854.2 µm or more and 2858.7 µm or less.
(11) A magnetic tape, including:
  a magnetic layer that includes a plurality of servo bands arrayed at intervals in a width direction,
  the magnetic layer at least partially having a region in which a servo band pitch that is a distance between two adjacent servo bands is narrower than an arrangement interval of two servo read heads in a tape drive device that records information in the magnetic layer or reproduces information recorded in the magnetic layer.
(12) The magnetic tape according to (11) above, in which
  a difference between the servo band pitch in the region and the arrangement interval of the two servo read heads is 0.1 µm or more and 4.6 µm or less.
(13) The magnetic tape according to (12) above, in which
  a difference between the servo band pitch in the region and the arrangement interval of the two servo read heads is 0.5 µm or more and 4.6 µm or less.
(14) A tape cartridge, including:
  a cartridge case;
  a tape reel that is rotatably housed inside the cartridge case; and
  a magnetic tape wound around the tape reel,
  the magnetic tape including a magnetic layer in which a plurality of servo patterns recorded at intervals in a tape width direction is recorded,
  the magnetic layer having
    a first region in which a servo band pitch that is a distance between two adjacent servo bands is narrower than an arrangement interval of two servo read heads in a tape drive device that records information in the magnetic layer or reproduces information recorded in the magnetic layer, and
    a second region in which the servo band pitch is wider than the arrangement interval of the two servo read heads.
(15) The tape cartridge according to (14) above, in which
  the first region is a region of the magnetic tape wound around the tape reel on a first end portion side of an outer periphery side, and
  the second region is a region of the magnetic tape wound around the tape reel on a second end portion side of an inner peripheral side.
(16) The tape cartridge according to (15) above, in which
  the servo band pitch of the magnetic layer gradually widens from the first end portion side of the magnetic tape toward the second end portion side.

REFERENCE SIGNS LIST 1 magnetic tape
6 servo pattern
10 tape cartridge
11 cartridge case
13 tape reel
30 tape drive device
36 drive head
43 magnetic layer
100 servo pattern recording apparatus
113 servo write head
132 servo read head
601, 602 servo pattern

The invention claimed is:
1. A servo pattern recording method of recording a servo pattern in a plurality of servo bands arrayed at intervals in a width direction of a magnetic layer of a magnetic tape, comprising:

causing the magnetic tape to travel with a predetermined tension; and recording a servo pattern in the plurality of servo bands, over the magnetic tape between a beginning of tape and an end of tape, at a second pitch narrower than a first pitch that is an arrangement interval of two servo read heads in a tape drive device that records data in the magnetic layer or reproduces data recorded in the magnetic layer.

2. The servo pattern recording method according to claim 1, wherein
a difference of the second pitch from the first pitch is 5 μm or less.

3. The servo pattern recording method according to claim 2, wherein
the second pitch is 2854.2 μm or more and 2858.7 μm or less.

4. The servo pattern recording method according to claim 1, wherein
the predetermined tension is 0.3 N or more and 0.6 N or less.

5. A servo pattern recording apparatus that records a servo pattern in a plurality of servo bands arrayed at intervals in a width direction of a magnetic layer of a magnetic tape, comprising:
a servo write head that includes a plurality of recording units arranged corresponding to the plurality of servo bands,
each of the plurality of recording units including a magnetic gap for recording a servo pattern in the plurality of servo bands, over the magnetic tape between a beginning of tape and an end of tape, at a second pitch narrower than a first pitch that is an arrangement interval of two servo read heads in a tape drive device that records data in the magnetic layer or reproduces data recorded in the magnetic layer.

6. The servo pattern recording apparatus according to claim 5, wherein
a difference of the second pitch from the first pitch is 5 μm or less.

7. The servo pattern recording apparatus according to claim 6, wherein
the second pitch is 2854.2 μm or more and 2858.7 μm or less.

8. A method of producing a magnetic tape that includes a magnetic layer including a plurality of servo bands arrayed at intervals in a width direction, comprising:
causing the magnetic tape to travel with a predetermined tension; and
recording a servo pattern in the plurality of servo bands, over the magnetic tape between a beginning of tape and an end of tape, at a second pitch narrower than a first pitch that is an arrangement interval of two servo read heads in a tape drive device that records data in the magnetic layer or reproduces data recorded in the magnetic layer.

9. The method of producing a magnetic tape according to claim 8, wherein
a difference of the second pitch from the first pitch is 5 μm or less.

10. The method of producing a magnetic tape according to claim 8, wherein
the second pitch is 2854.2 μm or more and 2858.7 μm or less.

11. A magnetic tape, comprising:
a magnetic layer that includes a plurality of servo bands, over the magnetic tape between a beginning of tape and an end of tape, arrayed at intervals in a width direction,
the magnetic layer at least partially having a region in which a servo band pitch that is a distance between two adjacent servo bands is narrower than an arrangement interval of two servo read heads in a tape drive device that records information in the magnetic layer or reproduces information recorded in the magnetic layer.

12. The magnetic tape according to claim 11, wherein
a difference between the servo band pitch in the region and the arrangement interval of the two servo read heads is 0.1 μm or more and 4.6 μm or less.

13. The magnetic tape according to claim 12, wherein
a difference between the servo band pitch in the region and the arrangement interval of the two servo read heads is 0.5 μm or more and 4.6 μm or less.

14. A tape cartridge, comprising:
a cartridge case;
a tape reel that is rotatably housed inside the cartridge case; and
a magnetic tape wound around the tape reel,
the magnetic tape including a magnetic layer in which a plurality of servo patterns recorded, over the magnetic tape between a beginning of tape and an end of tape, at intervals in a tape width direction is recorded,
the magnetic layer having
a first region in which a servo band pitch that is a distance between two adjacent servo bands is narrower than an arrangement interval of two servo read heads in a tape drive device that records information in the magnetic layer or reproduces information recorded in the magnetic layer, and
a second region in which the servo band pitch is wider than the arrangement interval of the two servo read heads.

15. The tape cartridge according to claim 14, wherein
the first region is a region of the magnetic tape wound around the tape reel on a first end portion side of an outer periphery side, and
the second region is a region of the magnetic tape wound around the tape reel on a second end portion side of an inner peripheral side.

16. The tape cartridge according to claim 15, wherein
the servo band pitch of the magnetic layer gradually widens from the first end portion side of the magnetic tape toward the second end portion side.

* * * * *